United States Patent
Abdelghaffar et al.

(10) Patent No.: US 12,081,337 B2
(45) Date of Patent: Sep. 3, 2024

(54) HYBRID AUTOMATIC REPEAT REQUEST FEEDBACK WITH MULTIPLE UPLINK CHANNELS

(71) Applicant: QUALCOMM Incorporated, San Diego, CA (US)

(72) Inventors: Muhammad Sayed Khairy Abdelghaffar, San Jose, CA (US); Seyed Ali Akbar Fakoorian, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/303,827

(22) Filed: Jun. 8, 2021

(65) Prior Publication Data

US 2021/0391953 A1 Dec. 16, 2021

Related U.S. Application Data

(60) Provisional application No. 63/038,531, filed on Jun. 12, 2020.

(51) Int. Cl.
*H04L 1/1812* (2023.01)
*H04B 7/0413* (2017.01)
(Continued)

(52) U.S. Cl.
CPC ......... *H04L 1/1812* (2013.01); *H04B 7/0413* (2013.01); *H04W 72/1268* (2013.01); *H04W 72/23* (2023.01)

(58) Field of Classification Search
None
See application file for complete search history.

(56) References Cited

U.S. PATENT DOCUMENTS

2010/0329378 A1* 12/2010 Leung ............... H04B 7/0697
455/337
2011/0085502 A1* 4/2011 Malladi ............ H04L 1/1671
370/329

(Continued)

FOREIGN PATENT DOCUMENTS

EP 3624529 A1 3/2020
WO WO-2016119232 A1 8/2016

OTHER PUBLICATIONS

International Search Report and Written Opinion—PCT/US2021/070681—ISA/EPO—Sep. 24, 2021.

(Continued)

*Primary Examiner* — Liem H. Nguyen
(74) *Attorney, Agent, or Firm* — Harrity & Harrity, LLP

(57) ABSTRACT

Some techniques and apparatuses described herein provide reporting of multiple feedbacks for a same transport block (TB) or a same code block group (CBG) of a signal, such as a physical downlink shared channel. Thus, in case of a failure to decode a signal via a first set of antennas, a user equipment (UE) can perform a second decoding attempt via a second set of antennas (before or after transmitting first feedback). The UE may report a result of the first decoding attempt in a first feedback, and may report a result of the second decoding attempt in a second feedback. Some techniques and apparatuses described herein also provide soft feedback (e.g., information other than a binary acknowledgment (ACK) or negative ACK (NACK)) for a transmission, such as information indicating whether a second attempt to decode the transmission is likely to be successful.

30 Claims, 18 Drawing Sheets

(51) Int. Cl.
*H04W 72/1268* (2023.01)
*H04W 72/23* (2023.01)

(56) References Cited

U.S. PATENT DOCUMENTS

| | | | | |
|---|---|---|---|---|
| 2011/0235599 | A1* | 9/2011 | Nam | H04W 72/02 370/329 |
| 2012/0027113 | A1* | 2/2012 | Gaal | H04B 7/0417 375/267 |
| 2013/0223301 | A1* | 8/2013 | Lee | H04L 5/14 370/329 |
| 2016/0337096 | A1* | 11/2016 | Chari | H04L 5/006 |
| 2017/0214494 | A1* | 7/2017 | Qiang | H04L 1/0003 |
| 2017/0238255 | A1* | 8/2017 | Chari | H04L 1/0053 455/574 |
| 2017/0332358 | A1* | 11/2017 | Park | H04W 72/0446 |
| 2017/0359815 | A1* | 12/2017 | Chendamarai Kannan | H04W 72/541 |
| 2018/0123664 | A1* | 5/2018 | Li | H04B 7/0413 |
| 2019/0222394 | A1* | 7/2019 | Medles | H04L 1/1812 |
| 2019/0280757 | A1* | 9/2019 | Yang | H04L 5/0048 |
| 2019/0313389 | A1* | 10/2019 | John Wilson | H04W 72/21 |
| 2020/0213058 | A1* | 7/2020 | Choi | H04L 5/0023 |
| 2020/0403755 | A1* | 12/2020 | Chen | H04L 5/0094 |
| 2021/0204358 | A1* | 7/2021 | Babaei | H04W 72/23 |
| 2021/0306102 | A1* | 9/2021 | Li | H04L 1/06 |
| 2022/0103305 | A1* | 3/2022 | Xiong | H04W 80/02 |
| 2022/0123906 | A1* | 4/2022 | Wu | H04L 1/1812 |
| 2022/0190886 | A1* | 6/2022 | Islam | H04W 72/044 |
| 2022/0209902 | A1* | 6/2022 | Gao | H04L 5/0051 |
| 2022/0232613 | A1* | 7/2022 | Gao | H04L 1/1887 |
| 2022/0322326 | A1* | 10/2022 | Wong | H04L 1/1854 |
| 2023/0109947 | A1* | 4/2023 | Parkvall | H04W 52/0229 455/418 |
| 2023/0132212 | A1* | 4/2023 | Gao | H04L 1/1812 370/329 |

OTHER PUBLICATIONS

Oppo: "HARQ Procedure on NR-U", 3GPP Draft, 3GPP TSG RAN WG1 Meeting #93, R1-1806854, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442054, 3 Pages, Retrieved from the Internet: URL: http://www.3gpp.org/ftp/Meetings%5F3GPP%5FSYNC/RAN1/Docs/. [Retrieved on May 20, 2018] pp. 1-2.

Qualcomm Incorporated: "Aspects Related to Interaction Between Different TTI Lengths", 3GPP Draft, 3GPP TSG RAN WG1 #92, R1-1802308, Aspects Related to Interaction Between Different TTI Lengths, 3rd Generation Partnership Project (3GPP), Mobile Competence Centre, 650, Route Des Lucioles, F-06921 Sophia-Anti, vol. RAN WG1, No. Athens, Greece, Feb. 26, 2018-Mar. 2, 2018, Feb. 17, 2018 (Feb. 17, 2018), XP051397836, 7 Pages, Retrieved from the Internet: URL: http://www.3gpp.org/ftp/tsg%5Fran/WG1%5FRL1/TSGR1%5F92/Docs/. [Retrieved on Feb. 17, 2018] p. 6.

* cited by examiner

HYBRID AUTOMATIC REPEAT REQUEST FEEDBACK WITH MULTIPLE UPLINK CHANNELS

CROSS-REFERENCE TO RELATED APPLICATION

This Patent Application claims priority to U.S. Provisional Patent Application No. 63/038,531, filed on Jun. 12, 2020, entitled "HYBRID AUTOMATIC REPEAT REQUEST FEEDBACK WITH MULTIPLE UPLINK CHANNELS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request (HARQ) feedback with multiple uplink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A wireless communication device, such as a UE or a customer premises equipment (CPE), may use an architecture with multiple sets of antennas (e.g., multiple antenna panels, multiple sub-panels, or multiple groups of panels). The usage of multiple sets of antennas may improve receive diversity of the wireless communication device. For example, a wireless communication device may determine respective sets of least-likelihood ratios (LLRs) for two or more sets of receive antennas, and may decode a signal based at least in part on the respective sets of LLRs. However, the quality of the LLRs from each set of receive antennas may be different due to channel conditions for each set of receive antennas, such as channel fading conditions, blockage, and/or the like. Furthermore, a UE may have a limited timeline and limited hardware complexity to decode a transport block (TB) and prepare feedback (e.g., hybrid automatic repeat request (HARD) feedback) indicating a result of decoding the TB, and thus may be unable to do multiple decode trials based on either individual LLRs or combined LLRs before the feedback is due to be transmitted. Even further, in some aspects, a UE may have only one demodulator, and may only be able to generate one set of LLRs. Therefore, adding two instances of demodulation will increase the UE complexity. Also, one set of the LLRs generated by the two instances of modulation may be worse than the other, and combining both sets of LLRs may not yield a significant or worthwhile performance gain. Therefore, the combination of multiple sets of LLRs may not be feasible within HARQ reporting timelines for a single HARQ feedback, and some UEs may not benefit from determining and combining multiple sets of LLRs in all situations.

Some techniques and apparatuses described herein provide reporting of multiple feedbacks (such as multiple physical uplink control channel (PUCCH) transmissions carrying respective feedback) for a same TB or a same code block group (CBG) of a signal, such as a physical downlink shared channel (PDSCH). Thus, in case of a failure to decode a signal via a first set of LLRs, a UE can use a second set of LLRs from a second antenna panel to perform a second decoding attempt (before or after transmitting first feedback). The UE may report a result of the first decoding attempt in a first feedback, and may report a result of the second decoding attempt in a second feedback. Thus, techniques and apparatuses described herein provide a relaxed timeline for determination and reporting of multiple decoding attempts, which may be particularly useful for UEs or CPEs having multiple sets of antennas for which multiple decoding attempts can be performed. Thus, receive diversity is improved while minimizing the increase in complexity at the UE or CPE. Some techniques and apparatuses described herein also provide soft feedback (e.g., information other than a binary acknowledgment (ACK) or negative ACK (HACK)) for a transmission, such as information indicating whether a second attempt to decode the transmission is likely to be successful. By being provided with a second opportunity for feedback regarding a signal, the UE is afforded extra time to attempt additional decodes using different combinations of LLRs, thereby increasing the likelihood of successfully decoding a transmission. Furthermore, attempting to decode using multiple different combinations of LLRs may reduce UE complexity relative to a single-panel implementation with an equal number of antenna elements, thereby reducing cost and processing resource usage of the UE.

In some aspects, a method of wireless communication, performed by a user equipment, may include receiving control information scheduling a first uplink channel for hybrid automatic repeat request (HARQ) feedback, wherein the first uplink channel is associated with a second uplink channel for HARQ feedback subsequent to the first uplink channel; receiving a downlink data transmission; transmitting first feedback on the first uplink channel based at least in part on a first result of demodulating the downlink data transmission; and selectively transmitting second feedback on the second uplink channel based at least in part on a second result of demodulating the downlink data transmission.

In some aspects, a method of wireless communication, performed by a user equipment, may include performing multiple attempts to demodulate a downlink data transmission as received via multiple different antenna sets; and transmitting an uplink control channel including feedback associated with the multiple attempts, wherein the feedback indicates respective results of the multiple attempts and information associated with the multiple attempts.

In some aspects, a method of wireless communication, performed by a base station, may include transmitting, to a UE, control information scheduling a first uplink channel for HARQ feedback, wherein the first uplink channel is associated with a second uplink channel for HARQ feedback subsequent to the first uplink channel; transmitting, to the UE, a downlink data transmission; receiving first feedback on the first uplink channel based at least in part on a first result of the UE demodulating the downlink data transmission; and selectively receiving second feedback on the second uplink channel based at least in part on a second result of the UE demodulating the downlink data transmission.

In some aspects, a method of wireless communication, performed by a base station, may include receiving, from a UE, an uplink control channel including feedback associated with multiple attempts to demodulate a downlink data transmission as received via multiple different antenna sets of the UE, wherein the feedback indicates respective results of the multiple attempts and information associated with the multiple attempts; and performing a retransmission of the downlink data transmission or a subsequent transmission based at least in part on the information associated with the multiple attempts.

An apparatus for wireless communication at a UE may include at least one processor, and at least one memory communicatively coupled with the at least one processor and storing processor-readable code that, when executed by the at least one processor, is configured to cause the apparatus to receive control information scheduling a first uplink channel for HARQ feedback, wherein the first uplink channel is associated with a second uplink channel for HARQ feedback subsequent to the first uplink channel; receive a downlink data transmission; transmit first feedback on the first uplink channel based at least in part on a first result of demodulating the downlink data transmission; and selectively transmit second feedback on the second uplink channel based at least in part on a second result of demodulating the downlink data transmission.

An apparatus for wireless communication at a UE may include at least one processor, and at least one memory communicatively coupled with the at least one processor and storing processor-readable code that, when executed by the at least one processor, is configured to cause the apparatus to perform multiple attempts to demodulate a downlink data transmission as received via multiple different antenna sets; and transmit an uplink control channel including feedback associated with the multiple attempts, wherein the feedback indicates respective results of the multiple attempts and information associated with the multiple attempts.

An apparatus for wireless communication at a base station may include at least one processor, and at least one memory communicatively coupled with the at least one processor and storing processor-readable code that, when executed by the at least one processor, is configured to cause the apparatus to transmit, to a UE, control information scheduling a first uplink channel for HARQ feedback, wherein the first uplink channel is associated with a second uplink channel for HARQ feedback subsequent to the first uplink channel; transmit, to the UE, a downlink data transmission; receive first feedback on the first uplink channel based at least in part on a first result of the UE demodulating the downlink data transmission; and selectively receive second feedback on the second uplink channel based at least in part on a second result of the UE demodulating the downlink data transmission.

An apparatus for wireless communication at a base station may include at least one processor, and at least one memory communicatively coupled with the at least one processor and storing processor-readable code that, when executed by the at least one processor, is configured to cause the apparatus to receive, from a UE, an uplink control channel including feedback associated with multiple attempts to demodulate a downlink data transmission as received via multiple different antenna sets of the UE, wherein the feedback indicates respective results of the multiple attempts and information associated with the multiple attempts; and perform a retransmission of the downlink data transmission or a subsequent transmission based at least in part on the information associated with the multiple attempts.

In some aspects, a non-transitory computer-readable medium may store one or more instructions for wireless communication. The one or more instructions, when executed by one or more processors of a UE, may cause the one or more processors to receive control information scheduling a first uplink channel for HARQ feedback, wherein the first uplink channel is associated with a second uplink channel for HARQ feedback subsequent to the first uplink channel; receive a downlink data transmission; transmit first feedback on the first uplink channel based at least in part on a first result of demodulating the downlink data transmission; and selectively transmit second feedback on the second uplink channel based at least in part on a second result of demodulating the downlink data transmission.

In some aspects, a non-transitory computer-readable medium may store one or more instructions for wireless communication. The one or more instructions, when executed by one or more processors of a UE, may cause the one or more processors to perform multiple attempts to demodulate a downlink data transmission as received via multiple different antenna sets; and transmit an uplink control channel including feedback associated with the multiple attempts, wherein the feedback indicates respective results of the multiple attempts and information associated with the multiple attempts.

In some aspects, a non-transitory computer-readable medium may store one or more instructions for wireless communication. The one or more instructions, when executed by one or more processors of a base station, may cause the one or more processors to transmit, to a UE, control information scheduling a first uplink channel for HARQ feedback, wherein the first uplink channel is associated with a second uplink channel for HARQ feedback subsequent to the first uplink channel; transmit, to the UE, a downlink data transmission; receive first feedback on the first uplink channel based at least in part on a first result of the UE demodulating the downlink data transmission; and selectively receive second feedback on the second uplink channel based at least in part on a second result of the UE demodulating the downlink data transmission.

In some aspects, a non-transitory computer-readable medium may store one or more instructions for wireless communication. The one or more instructions, when executed by one or more processors of a base station, may cause the one or more processors to receive, from a UE, an uplink control channel including feedback associated with multiple attempts to demodulate a downlink data transmission as received via multiple different antenna sets of the UE, wherein the feedback indicates respective results of the multiple attempts and information associated with the multiple attempts; and perform a retransmission of the downlink data transmission or a subsequent transmission based at least in part on the information associated with the multiple attempts.

In some aspects, an apparatus for wireless communication may include means for receiving control information scheduling a first uplink channel for HARQ feedback, wherein the first uplink channel is associated with a second uplink channel for HARQ feedback subsequent to the first uplink channel; means for receiving a downlink data transmission; means for transmitting first feedback on the first uplink channel based at least in part on a first result of demodulating the downlink data transmission; and means for selectively transmitting second feedback on the second uplink channel based at least in part on a second result of demodulating the downlink data transmission.

In some aspects, an apparatus for wireless communication may include means for performing multiple attempts to demodulate a downlink data transmission as received via multiple different antenna sets; and means for transmitting an uplink control channel including feedback associated with the multiple attempts, wherein the feedback indicates respective results of the multiple attempts and information associated with the multiple attempts.

In some aspects, an apparatus for wireless communication may include means for transmitting, to a UE, control information scheduling a first uplink channel for HARQ feedback, wherein the first uplink channel is associated with a second uplink channel for HARQ feedback subsequent to the first uplink channel; means for transmitting, to the UE, a downlink data transmission; means for receiving first feedback on the first uplink channel based at least in part on a first result of the UE demodulating the downlink data transmission; and means for selectively receiving second feedback on the second uplink channel based at least in part on a second result of the UE demodulating the downlink data transmission.

In some aspects, an apparatus for wireless communication may include means for receiving, from a UE, an uplink control channel including feedback associated with multiple attempts to demodulate a downlink data transmission as received via multiple different antenna sets of the UE, wherein the feedback indicates respective results of the multiple attempts and information associated with the multiple attempts; and means for performing a retransmission of the downlink data transmission or a subsequent transmission based at least in part on the information associated with the multiple attempts.

Aspects generally include a method, apparatus, system, computer program product, non-transitory computer-readable medium, user equipment, base station, wireless communication device, and/or processing system as substantially described with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
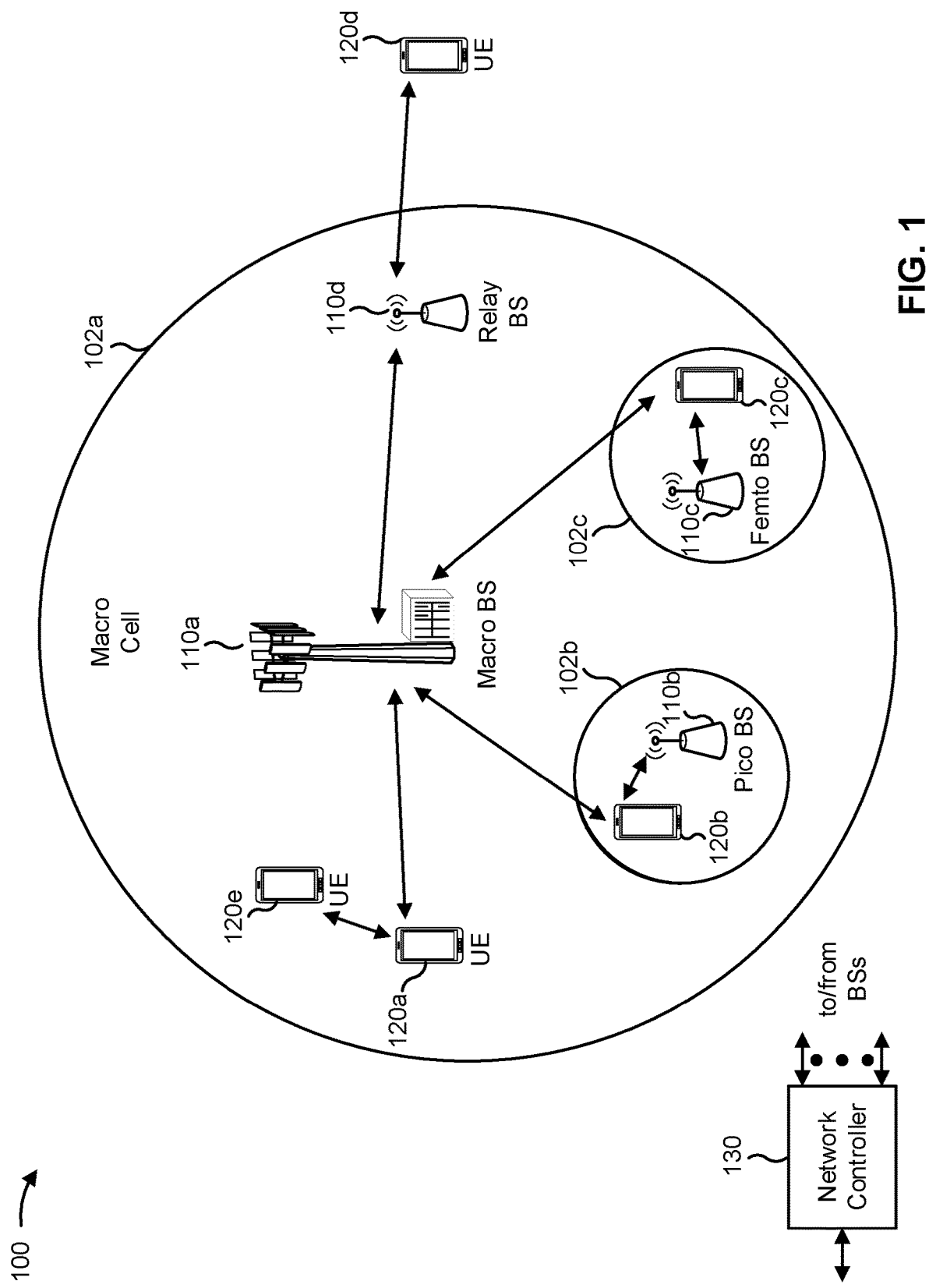
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
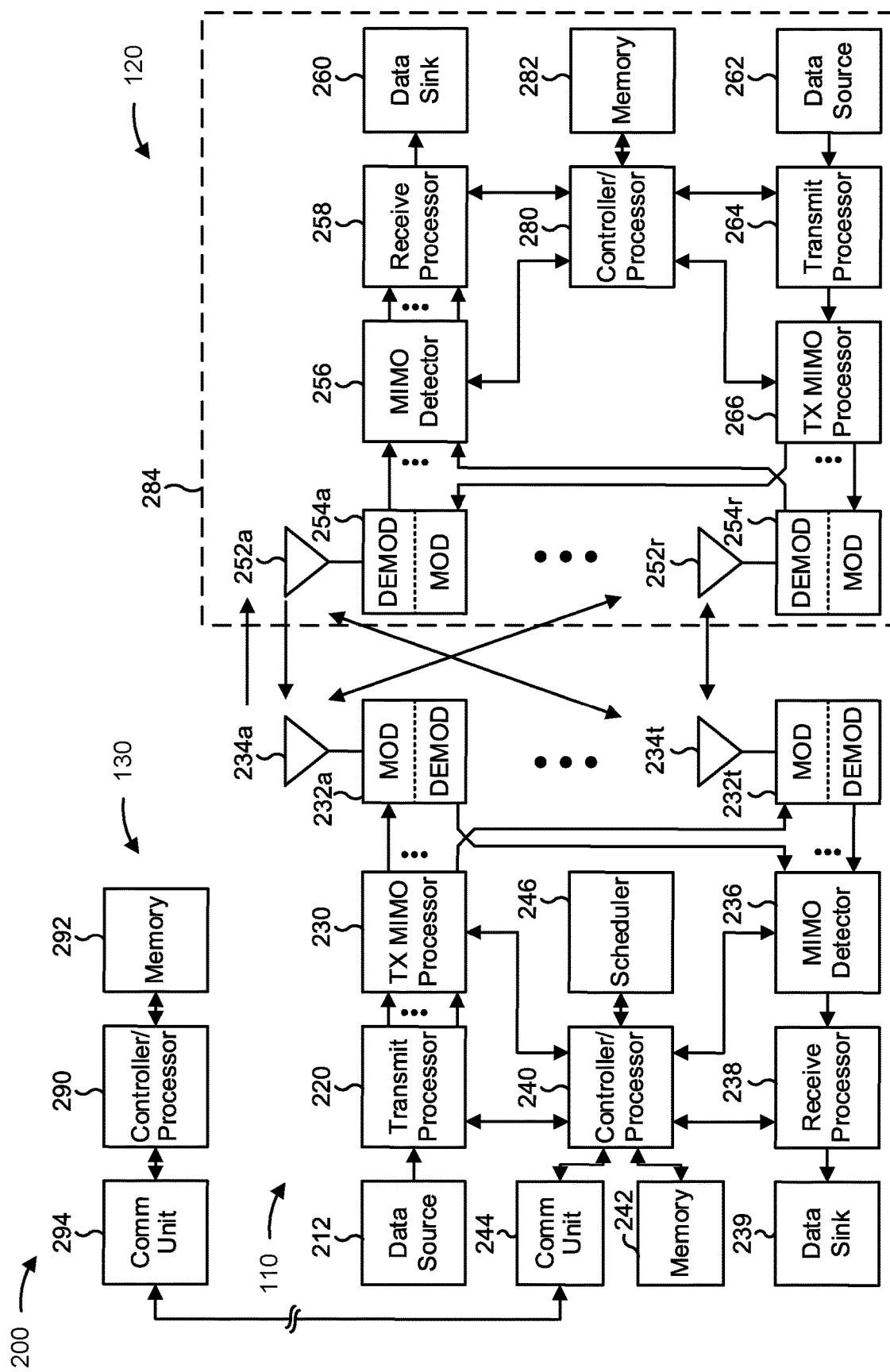
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with HARQ feedback with multiple uplink channels, as described in more detail elsewhere herein. For example, controller/processor 240 of base station 110, controller/processor 280 of UE 120, and/or any other component(s) of FIG. 2 may perform or direct operations of, for example, methods 600, 700, 800, or 900 of FIGS. 6-9, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, methods 600, 700, 800, or 900 of FIGS. 6-9, and/or other processes as described herein. In some aspects, executing instructions may include running the instructions, converting the instructions, compiling the instructions, and/or interpreting the instructions, among other examples.

As indicated above, FIG. 2 is provided as an example. Other examples may differ from what is described with regard to FIG. 2.

Figure 3A:
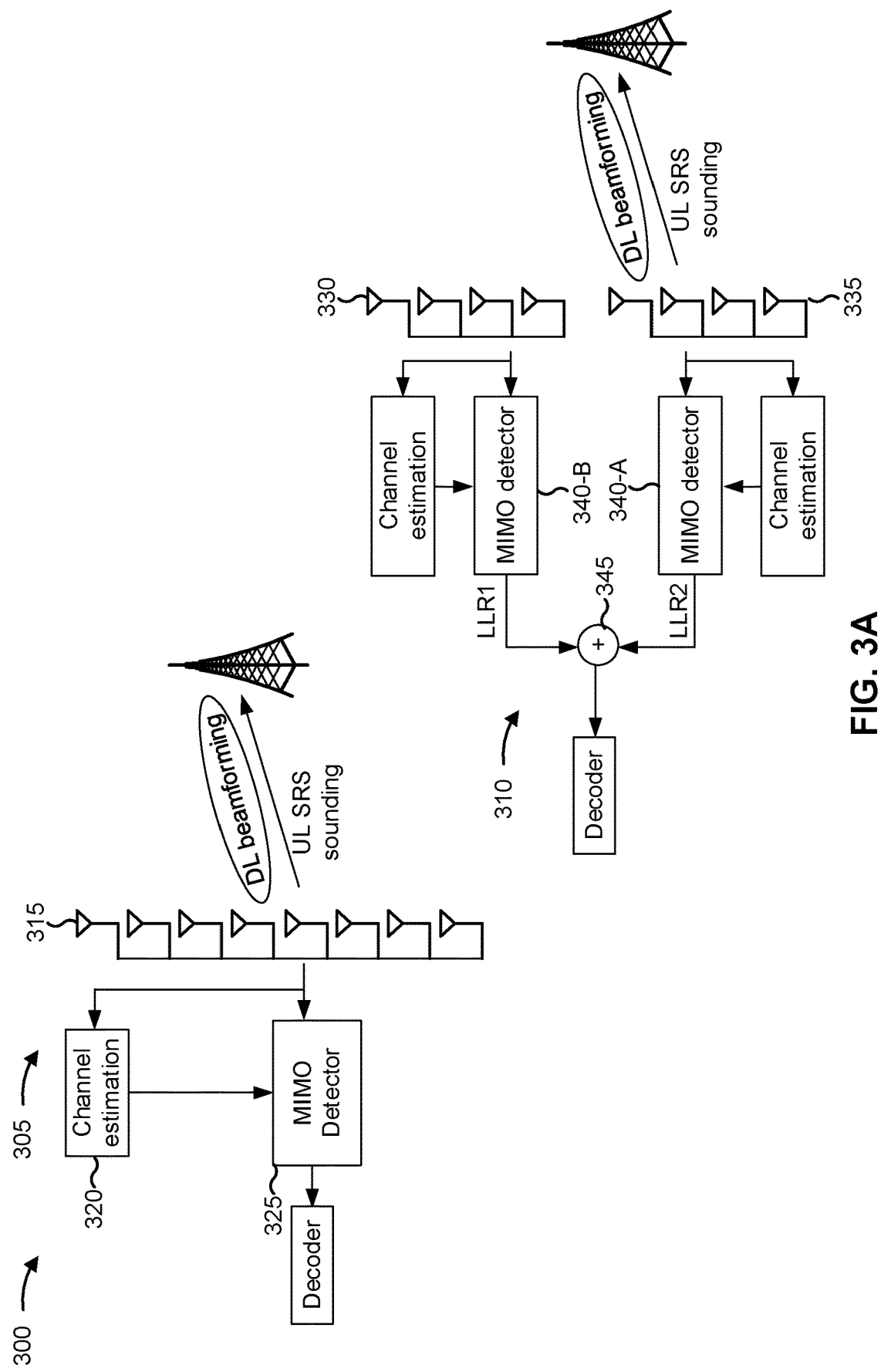
FIGS. 3A and 3B are diagrams illustrating examples of a first architecture, a second architecture, and a third architecture.
Figure 3B:
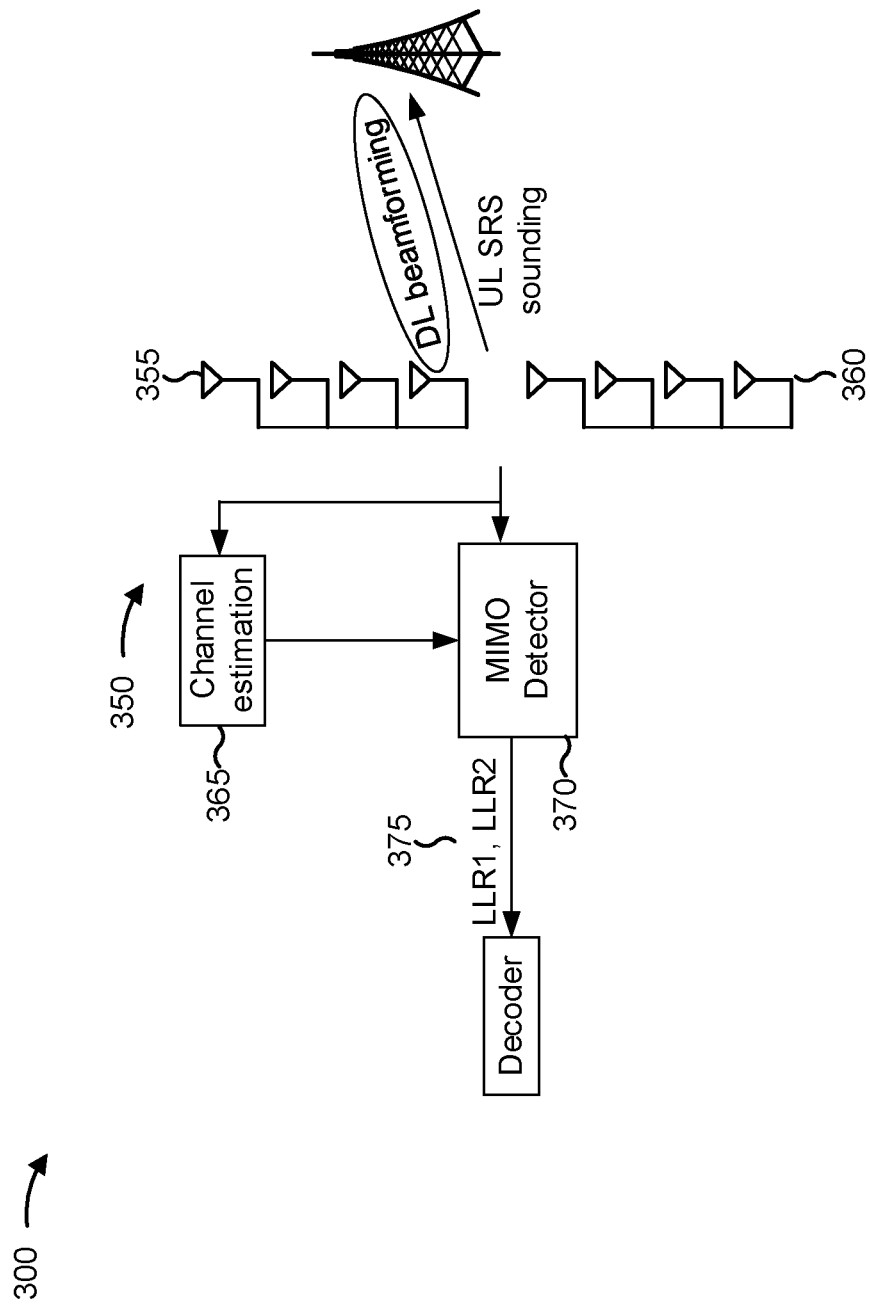

FIGS. 3A and 3B are diagrams illustrating examples 300 of a first architecture 305, a second architecture 310, and a third architecture 350. In some aspects, the architectures 305/310/350 may be implemented in a UE, such as a UE 120 or a CPE. The first architecture 305 may be referred to as an advanced demodulation architecture. The first architecture 305 may include a plurality of antennas 315 (e.g., antenna 252), a channel estimation component 320 (e.g., MOD/DEMOD 254), a multiple-input-multiple-output (MIMO) detector 325 (e.g., MIMO detector 256), and a decoder (e.g., RX processor 258). The antennas 315 may enable a UE to theoretically receive a number of communication layers equal to the number of antennas 315. For example, a UE with 8 receive antennas can theoretically support up to 8 downlink layers. However, as the number of supported layers approaches the number of antennas 315, the complexity of the MIMO detector 325 may increase. As the complexity of the MIMO detector 325 increases, baseband processing burden and complexity may increase as well.

The second architecture 310 includes a first set of antennas 330 (e.g., antenna 252) and a second set of antennas 335 (e.g., antenna 252). For example, the first set of antennas 330 and the second set of antennas 335 may be associated with respective antenna panels of a UE, sub-panels of a UE, groups of panels of a UE, and/or the like. In some aspects, the first set of antennas 330 and the second set of antennas 335 may be selected from eight total antennas (e.g., a first four antennas in the first set of antennas 330 and a second four antennas in the second set of antennas 335). In some other aspects, the first set of antennas 330 and the second set of antennas 335 may be selected from fewer than eight total antennas. For example, one or more antennas may be shared between the first set of antennas 330 and the second set of antennas 335, and may be switched between functioning as one of the first set of antennas 330 or one of the second set of antennas 335. The second architecture 310 may support a lesser number of layers than the first architecture 305. For example, the second architecture may support a number of layers equal to a number of receive antennas in a set of antennas 330 or 335 (e.g., 4 layers in FIG. 3). However, the second architecture 310 may be associated with less advanced MIMO detectors 340-A and 340-B (e.g., MIMO detector 256) than the first architecture 305, since each MIMO detector 340 may have to process fewer receive antenna signals. Therefore, the second architecture 310 may be associated with less complexity at the baseband than the first architecture 305. Furthermore, as shown by reference number 345, a UE using the second architecture can combine information received on two or more sets of antennas (e.g., sets of antennas 330/335) to improve downlink performance by way of receiver diversity. For example, according to techniques and apparatuses described herein, the UE may combine sets of least likelihood ratio (LLR) values determined based at least in part on a signal as received via the first set of antennas 330 and as received via the second set of antennas 335, and may decode the signal based at least in part on the combined sets of least likelihood ratio values. Techniques and apparatuses described herein also provide multi-part feedback regarding decoding operations of the first set of antennas 330 and the second set of antennas 335, such as on multiple different uplink control channels for a single transport block or set of code blocks.

The third architecture 350 includes a first set of antennas 355 (e.g., the first set of antennas 330, antenna 252) and a second set of antennas 360 (e.g., the second set of antennas 335, antenna 252). For example, the first set of antennas 355 and the second set of antennas 360 may be associated with respective antenna panels of a UE, sub-panels of a UE, groups of panels of a UE, and/or the like. In some aspects, the first set of antennas 355 and the second set of antennas 360 may be selected from eight total antennas (e.g., with a first four antennas in the first set of antennas 355 and a second four antennas in the second set of antennas 360). In some other aspects, the first set of antennas 355 and the second set of antennas 360 may be selected from fewer than eight total antennas. For example, one or more antennas may be shared between the first set of antennas 355 and the second set of antennas 360, and may be switched between functioning as one of the first set of antennas 355 or one of the second set of antennas 360. The third architecture 350 may support a lesser number of layers than the first architecture 305. For example, the third architecture may support a number of layers equal to a number of receive antennas in a set of antennas 355 or 360 (e.g., 4 layers in FIG. 3B). However, the third architecture 350 may be associated with a less advanced MIMO detector 370 (e.g., MIMO detector 256) than the first architecture 305. For example, the MIMO detector 370 may have a four-layer MIMO detection capability (similar to the MIMO detectors 340-A and 340-B). Furthermore, the third architecture 350 may include a single channel estimation component 365. Therefore, the third architecture 350 may be associated with less implementation complexity than the second architecture 310, while being less complex at the baseband than the first architecture 305. Furthermore, as shown by reference number 375, a UE using the third architecture 350 can determine multiple LLR values, such as in succession. For example, the UE may determine a first LLR value (LLR1) using the first set of antennas 355. If the first LLR value does not lead to successful decoding of a signal, the UE may determine a second LLR value (LLR2) using the second set of antennas 360, which improves downlink performance by way of receiver diversity. The UE may perform successive attempts to decode using the first LLR value and the second LLR value, or may combine the first LLR value and the second LLR value for the purpose of decoding the signal. Techniques and apparatuses described herein also provide multi-part feedback regarding decoding operations of the first set of antennas 355 and the second set of antennas 360, such as on multiple different uplink control channels for a single transport block or set of code blocks. Thus, successive decoding attempts using a lower-complexity MIMO detector 370 can be supported by the transmission of multi-part feedback.

As indicated above, FIGS. 3A and 3B are provided as examples. Other examples may differ from what is described with regard to FIGS. 3A and 3B.

A UE (such as a UE 120, which may be a CPE as mentioned above) may use an architecture with multiple sets of antennas (e.g., multiple antenna panels, sub-panels, groups of panels, and/or the like), such as the architectures 310 and 350 described in connection with FIG. 3. The usage of multiple sets of antennas may improve receive diversity of the UE. For example, a UE may determine respective sets of LLRs for two or more sets of receive antennas, and may decode a signal based at least in part on the respective sets of LLRs. The quality of the LLRs from each set of receive antennas may be different due to channel conditions for each set of receive antennas, such as channel fading conditions, blockage, and/or the like. A UE may have a limited timeline and limited hardware complexity to decode a transport block (TB) and prepare feedback (e.g., hybrid automatic repeat request (HARQ) feedback) indicating a result of decoding the TB. If feedback for the TB is provided on a strict timeline, such as associated with a single PUCCH, the UE may be unable to do multiple decode trials based on either individual LLRs or combined LLRs before the feedback is to be transmitted. In some aspects, a UE may have only one demodulator, and may only be able to generate one set of LLRs. Therefore, adding two instances of demodulation will increase the UE complexity. Also, one set of the LLRs generated by the two instances of modulation may be worse than the other, and combining both LLR may not yield a significant or worthwhile performance gain. Therefore, the combination of multiple sets of LLRs may not be feasible within HARQ reporting timelines for a single HARQ feedback, and some UEs may not benefit from determining and combining multiple sets of LLRs in all situations.

Some techniques and apparatuses described herein provide reporting of multiple feedbacks for a same TB or a same code block group (CBG) of a signal, such as a physical downlink shared channel (PDSCH). Thus, in case of a failure to decode a signal via a first set of LLRs, a UE can use a second set of LLRs from a second antenna panel to perform a second decoding attempt (before or after transmitting first feedback). The UE may report a result of the first decoding attempt in a first feedback, and may report a result of the second decoding attempt in a second feedback. Some techniques and apparatuses described herein also provide soft feedback (e.g., information other than a binary acknowledgment (ACK) or negative ACK (NACK)) for a transmission, such as information indicating whether a second attempt to decode the transmission is likely to be successful. By being provided with a second opportunity for feedback regarding a signal, the UE is afforded extra time to attempt additional decodes using different combinations of LLRs, thereby increasing the likelihood of successfully decoding a transmission. Furthermore, attempting to decode using multiple different combinations of LLRs may reduce UE complexity relative to a single-panel implementation with an equal number of antenna elements, thereby reducing cost and processing resource usage of the UE.

Figure 4:
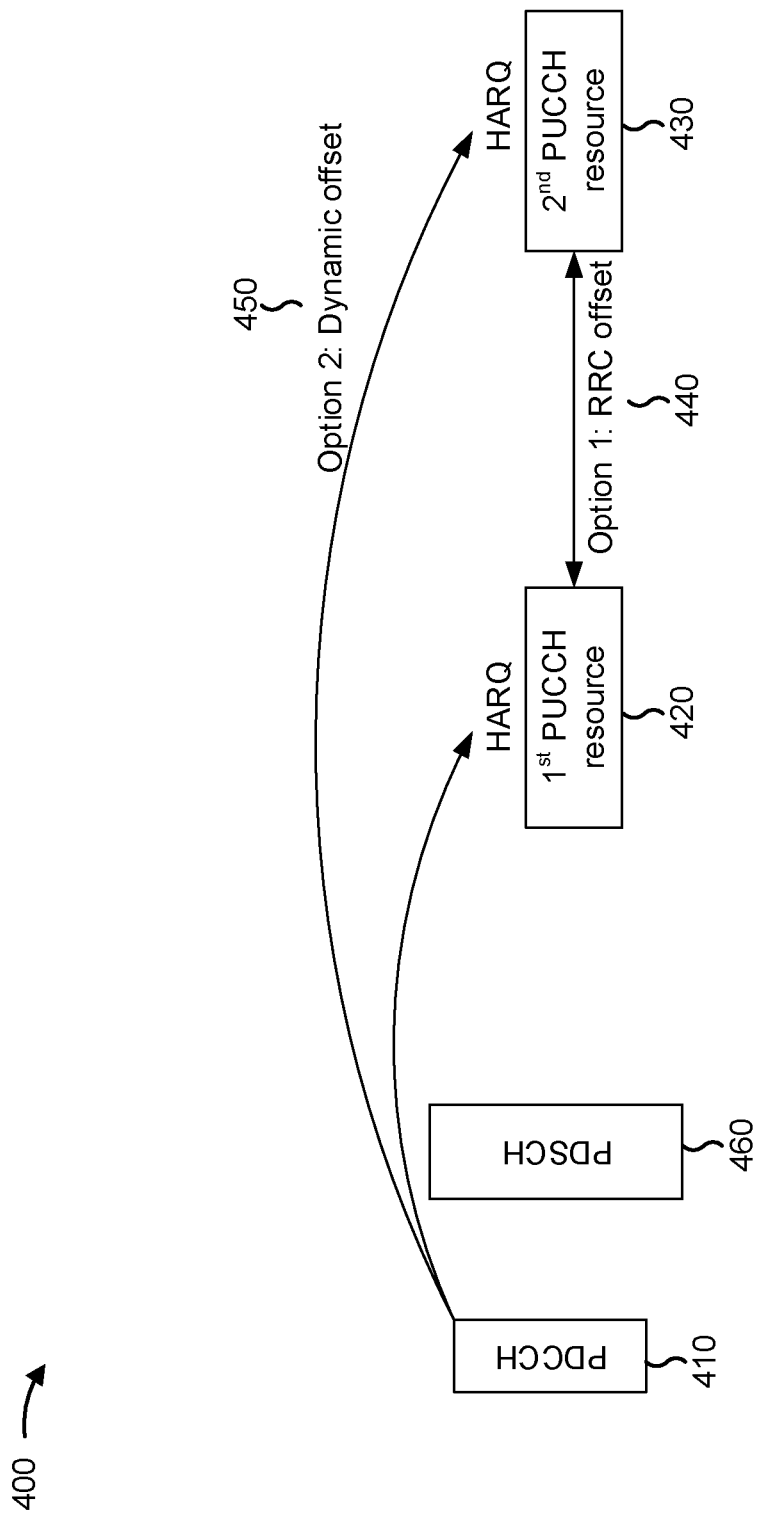
FIG. 4 is a diagram illustrating an example of configuration and signaling associated with reporting multiple feedbacks for a same transport block or a same code block group.

FIG. 4 is a diagram illustrating an example 400 of configuration and signaling associated with reporting multiple feedbacks for a same TB or a same CBG. A UE may receive a physical downlink control channel (PDCCH) and a physical downlink shared channel (PDSCH) from a base station, and may transmit physical uplink control channels (PUCCHs) on PUCCH resources. A PUCCH may carry feedback regarding a PDCCH and/or a PDSCH. A base station may transmit the PDCCH and the PDSCH, and may receive the PUCCHs on the PUCCH resources. The above example represents behavior for a dynamically granted PDSCH, which may be granted by a PDCCH. A PDSCH can also be semi-static configured (referred to as a semi-persistent scheduling PDSCH (SPS-PDSCH)) and activated or de-activated by means of RRC signaling and DCI. For an SPS-PDSCH, the UE 120 may transmit PUCCHs on PUCCH resources for a given transport block (TB).

As shown, a PDCCH 410 may indicate a first PUCCH resource 420. For example, the PDCCH may carry downlink control information (DCI) indicating the first PUCCH resource 420. As further shown, the first PUCCH resource 420 may be associated with a second PUCCH resource 430 subsequent to the first PUCCH resource 420. In some aspects, as shown by reference number 440, the second PUCCH resource 430 may be associated with an offset from the first PUCCH resource 420. For example, the offset may be configured using radio resource control (RRC) signaling or another form of signaling. As shown by reference number 450, in some other aspects, the second PUCCH resource 430 may be associated with a dynamic offset from the first PUCCH resource 420. For example, the dynamic offset may be indicated by the PDCCH 410 that grants the first PUCCH resource 420, such as in the form of a slot-based offset relative to the first PUCCH resource 420. The provision of the first PUCCH resource 420 and the second PUCCH resource 430 may enable the UE to perform a first decoding attempt and a second decoding attempt. For example, by providing two PUCCH resources at different times, the timeline for reporting feedback regarding the second decoding attempt may be sufficiently relaxed as to enable the UE to perform and report a result of the second decoding attempt.

At 460, a UE may receive a PDSCH. The UE may provide HARQ feedback for the PDSCH using the first PUCCH resource 420 and/or the second PUCCH resource 430. Various techniques for determining and providing the feedback are described below in connection with FIG. 5. The feedback provided on a PUCCH resource 420/430 may be a single bit or multiple bits. In some aspects, feedback provided via the first PUCCH resource 420 may be an early hybrid automatic repeat request acknowledgment (HARQ-ACK) report. In some aspects, the feedback provided via the first PUCCH resource may not be an early HARQ-ACK report (e.g., may be a baseline HARQ-ACK report). In some aspects, the feedback provided via the first PUCCH resource 420 may relate to a first decoding attempt (such as using a first set of antennas), and the feedback provided via the second PUCCH resource 430 may relate to a second decoding attempt (such as using a second set of antennas).

As indicated above, FIG. 4 is provided as an example. Other examples may differ from what is provided with regard to FIG. 4.

Figure 5:
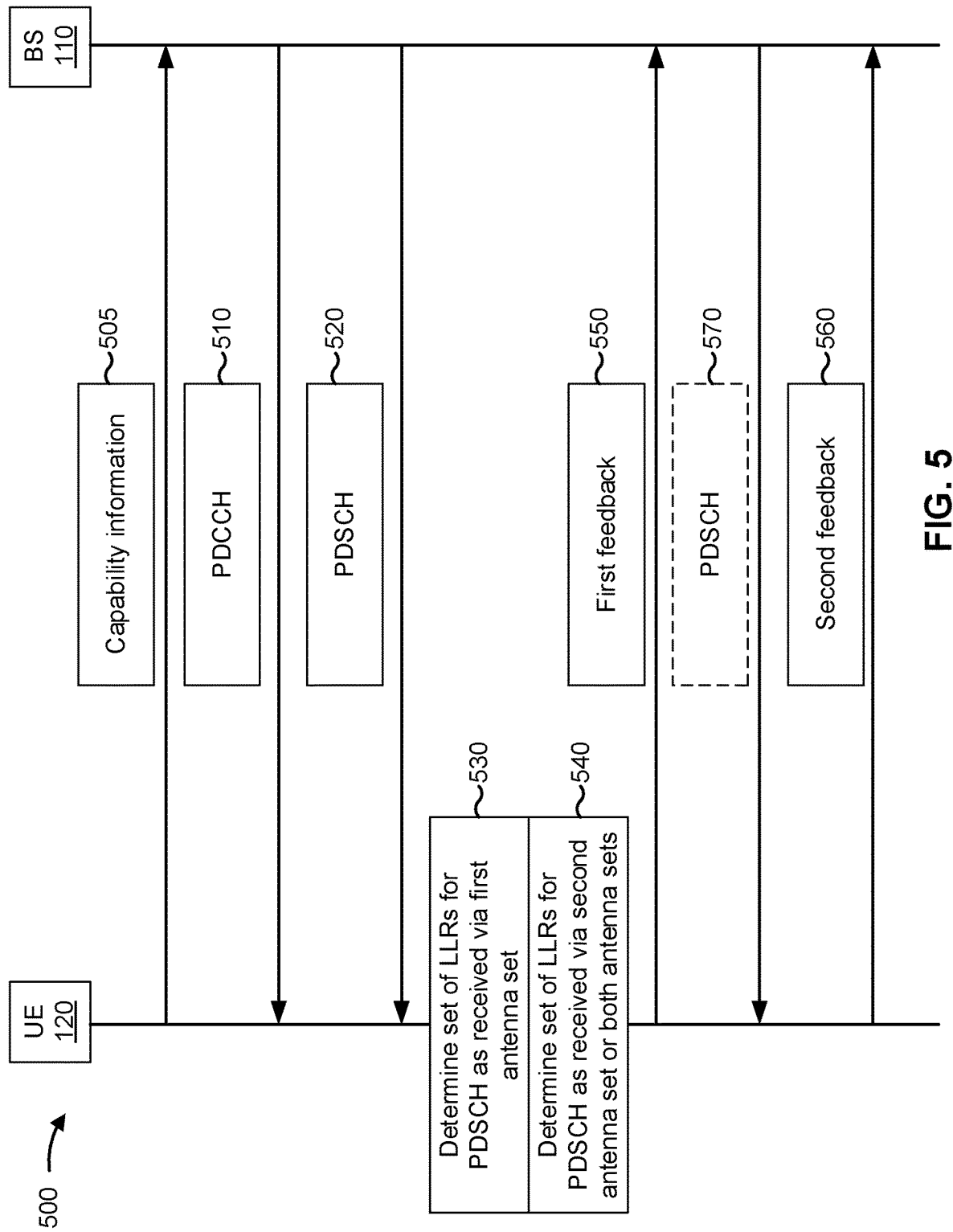
FIG. 5 is a diagram illustrating an example 500 of signaling associated with transmitting hybrid automatic repeat request feedback on multiple uplink control channels.

FIG. 5 is a diagram illustrating an example 500 of signaling associated with transmitting HARQ feedback on multiple uplink control channels. As shown, example 500 includes a BS 110 and a UE 120. In some aspects, the UE 120 may be associated with the second architecture 310 or the third architecture 350 depicted in FIGS. 3A and 3B, so that the UE 120 can determine two or more sets of least likelihood ratios (LLRs) for respective sets of antennas of the UE 120 and/or based at least in part on a combination of sets of LLRs from the respective sets of antennas.

At 505, in some aspects, the UE 120 may transmit capability information to the BS 110. The capability information may indicate whether the UE supports transmitting HARQ feedback on multiple uplink channels. For example, the capability information may indicate whether the UE supports selectively attempting a second demodulation of a downlink data channel as received via a second set of antennas if a first demodulation of the downlink data channel as received via a first set of antennas is unsuccessful. In some aspects, the BS 110 may provide the multiple uplink channels (for the first feedback 550 and the second feedback 560) based at least in part on the capability information.

The BS 110 may transmit a PDCCH 510 to the UE 120. The PDCCH 510 may indicate a first PUCCH resource and a second PUCCH resource. The first PUCCH resource and the second PUCCH resource may both be for HARQ feedback regarding a PDSCH 520. In some aspects, the first PUCCH resource may be indicated in DCI (e.g., based at least in part on a Release 15 UE capability for indication of a PUCCH resource). In some aspects, the second PUCCH resource may be shared between multiple UEs. For example, the BS 110 may configure multiple UEs with an overlapping PUCCH resource as the second PUCCH resource. This may be beneficial if the second PUCCH resource is unlikely to be used compared to the first PUCCH resource, for example, because of a successful decoding result leading to an ACK on the first PUCCH resource being likely.

The BS 110 may transmit a PDSCH 520 to the UE 120. The PDSCH 520 may be referred to herein as a signal.

At 530, the UE 120 may determine a first set of LLRs for the PDSCH 520 as received via a first antenna set (e.g., the first set of antennas 330 or 355). For example, the UE 120 may attempt to demodulate and decode the PDSCH 520 based at least in part on a set of LLRs determined using a first antenna set of the UE 120. If the UE 120 successfully demodulates and decodes the PDSCH 520 as received via the first antenna set, then the UE 120 may transmit an ACK on the first PUCCH resource, as shown by the first feedback 550. In this case, the UE 120 may not transmit the second feedback 560, thereby conserving signaling resources of the UE 120 and the BS 110.

At 540, if the UE 120 does not successfully decode or demodulate the PDSCH 520 as received via the first set of antennas, the UE 120 may determine a second set of LLRs for the PDSCH 520 as received via the second antenna set (e.g., the second set of antennas 335 or 360), or via both antenna sets. For example, the UE 120 may perform a second attempt at demodulating and decoding the PDSCH 520 as received via a second antenna set of the UE 120, such as by determining a second set of LLRs based at least in part on the PDSCH 520 as received via the second antenna set. Additionally, or alternatively, the UE 120 may combine a set of LLRs associated with the first antenna set and a set of LLRs associated with the second antenna set, and may attempt to decode the PDSCH 520 using the combined sets of LLRs. The UE 120 may provide second feedback 560 indicating a result of decoding the PDSCH 520 as received via the second set of antennas or both sets of antennas.

Thus, the UE 120 may determine first feedback 550 based at least in part on a first decoding attempt using a first antenna set and may selectively determine second feedback 560 based at least in part on a second decoding attempt using a second antenna set and/or both antenna sets. By performing the second decoding attempt only if the first decoding attempt is unsuccessful, the UE 120 conserves reception resources that would otherwise be used to determine the second decoding attempt as a matter of course. Furthermore, by providing HARQ feedback on two or more PUCCH resources, the timeline of the first feedback 550 can be satisfied while performing the second decoding attempt and transmitting second feedback 560. Thus, providing HARQ feedback on two or more PUCCH resources enables the reception of downlink communications using a larger number of antennas while processing the downlink communications using lower-complexity UE components (e.g., MIMO detector, channel estimator, etc.), which reduces the complexity of the UE's components and which conserves UE processing resources.

In some aspects, the first feedback 550 and the second feedback 560 may both relate to the PDSCH 520. For example, the first feedback 550 and the second feedback 560 may relate to a same TB or a same CBG of the PDSCH 520.

In some aspects, the first feedback 550 and/or the second feedback 560 may include soft reporting information. "Soft reporting information" refers to information regarding decoding or reception of a PDSCH 520 other than a binary ACK/NACK indication regarding the decoding or reception. For example, a feedback message (e.g., the first feedback 550 or the second feedback 560) may include multiple bits indicating information regarding a PDSCH 520. In some aspects, a first attempt at receiving the PDSCH 520 may fail, and the UE 120 may determine soft reporting information about a second attempt at receiving the PDSCH 520. For example, the soft reporting information may indicate whether a second set of LLRs corresponding to a second set of antennas is likely to lead to successful reception or decoding of the PDSCH 520 as received via the second set of antennas (e.g., based at least in part on blockage of the second set of antennas, channel quality associated with the second set of antennas, and/or the like). In this case, the soft reporting information may be transmitted in the first feedback 550 and may relate to the second set of LLRs or a combined set of LLRs for the first set of antennas and the second set of antennas. The BS 110 may determine whether to retransmit the PDSCH 520 or to await the second feedback 560 based at least in part on the soft reporting information.

As another example, the UE 120 may use a single PUCCH for transmission of soft reporting information. In this case, the soft reporting information may indicate a quality associated with a set of LLRs (e.g., a quantization of the set of LLRs, information indicating whether the set of LLRs satisfy a threshold, and/or the like). For example, the soft reporting information may indicate a quality associated with one or more of a first set of LLRs associated with a first demodulation attempt for a PDSCH 520 as received via a first set of antennas, a second set of LLRs associated with a second demodulation attempt for a PDSCH 520 as received via a second set of antennas, or a combination of the first set of LLRs and the second set of LLRs. The BS 110 may perform a retransmission (such as shown at 570) or a subsequent transmission based at least in part on the soft reporting information. For example, the BS 110 may determine a power allocation for a beam associated with the first set of antennas and/or the second set of antennas, a modulation and coding scheme for the retransmission or subsequent transmission, a redundancy version configuration for the retransmission or the subsequent transmission, and/or the like.

At 570, in some aspects, the BS 110 may retransmit the PDSCH 520. For example, the BS 110 may retransmit the PDSCH 520 before the second feedback 560 is received by the BS 110 based at least in part on receiving a NACK in the first feedback 550. In some aspects, the BS 110 may retransmit the PDSCH 520 based at least in part on receiving a NACK in early HARQ feedback of the first feedback 550. In some aspects, the first feedback 550 may include information indicating a preferred set of antennas (e.g., a preferred antenna panel) or a preferred beam for the retransmission. For example, the first feedback 550 may include information identifying a panel identifier, a beam identifier (e.g., a transmission configuration indication (TCI) value indicating a TCI state for a beam), and/or the like. This information may identify a receive beam or a receive antenna set, or may identify a transmit beam for the retransmission. In such a case, the BS 110 may perform the retransmission based at least in part on the transmit beam, the receive beam, or the receive antenna set. Thus, the UE 120 may improve the performance of the retransmission by reducing the likelihood of transmission failure due to blockages, poor channel conditions, and/or the like.

As indicated above, FIG. 5 is provided as an example. Other examples may differ from what is provided with regard to FIG. 5.

Figure 6:
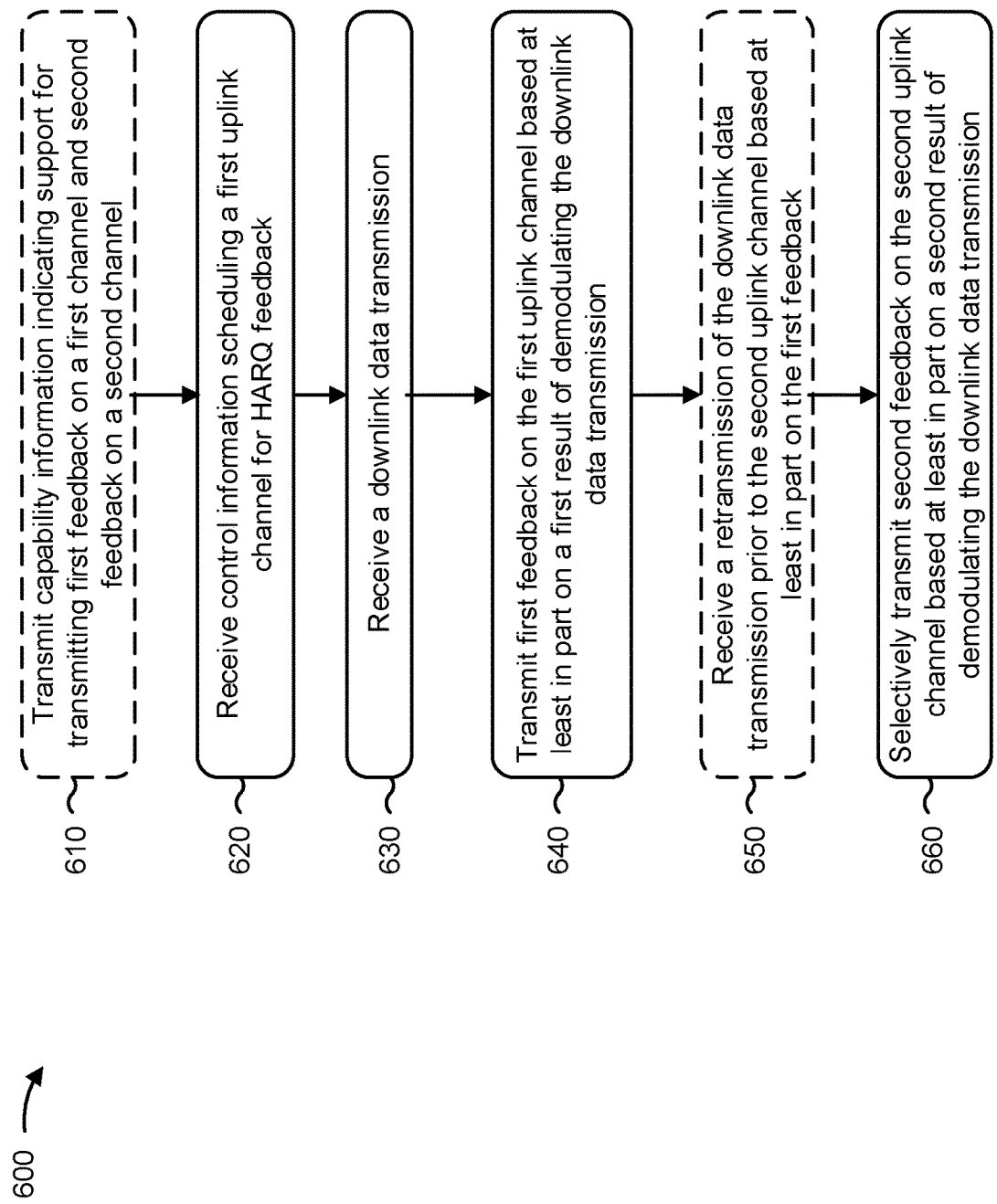
FIGS. 6-9 are flowcharts of example methods of wireless communication.

FIG. 6 is a flowchart of an example method 600 of wireless communication. The method 600 may be performed by, for example, a UE (e.g., UE 120, which may be a CPE, and/or the like).

At 610, the UE may transmit capability information indicating support for transmitting first feedback on a first channel and second feedback on a second channel. For example, the UE (e.g., using controller/processor 280, transmit processor 264, TX MIMO processor 266, MOD 254, antenna 252, and/or the like) may transmit capability information indicating support for selective demodulation using a second set of antennas if demodulation using a first set of antennas is unsuccessful. In some aspects, the second uplink channel is provided for the UE based at least in part on the capability information.

At 620, the UE may receive control information scheduling a first uplink channel for HARQ feedback. For example, the UE (e.g., using antenna 252, DEMOD 254, MIMO detector 256, receive processor 258, controller/processor 280, and/or the like) may receive control information scheduling a first uplink channel for HARQ feedback (e.g., first feedback 550 of FIG. 5), as described above in connection with FIG. 4 and at 410, and in connection with FIG. 5 at 510. In some aspects, the first uplink channel is associated with a second uplink channel for HARQ feedback (e.g., second feedback 560 of FIG. 5) subsequent to the first uplink channel.

In some aspects, the control information indicates a location of the second uplink channel. In some aspects, a location of the second uplink channel is based at least in part on a configured time offset from the first uplink channel. In some aspects, the second uplink channel is shared between multiple UEs including the UE.

At 630, the UE may receive a downlink data transmission. For example, the UE (e.g., using antenna 252, DEMOD 254, MIMO detector 256, receive processor 258, controller/processor 280, the first set of antennas 330/355, the second set of antennas 335/360, MIMO detector 340-A/340-B, MIMO detector 370, the set of antennas 315, the MIMO detector 325, and/or the like) may receive a downlink data transmission, such as PDSCH 520 of FIG. 5 or PDSCH 460 of FIG. 4.

At 640, the UE may transmit first feedback on the first uplink channel based at least in part on a first result of demodulating the downlink data transmission. For example, the UE (e.g., using controller/processor 280, transmit processor 264, TX MIMO processor 266, MOD 254, antenna 252, and/or the like) may transmit first feedback on the first uplink channel based at least in part on a first result of demodulating the downlink data transmission, such as first feedback 550 on a first PUCCH resource 420. In some aspects, the first result may relate to a first attempt to demodulate or decode the downlink data transmission as received via a first set of antennas. The first feedback may indicate a HARQ result (e.g., an ACK or NACK) and/or soft reporting information, as described elsewhere herein. In some aspects, the first feedback indicates one or more transmission configuration indicator (TCI) states of one or more beams for a retransmission of the downlink data transmission. In some aspects, the first feedback includes information indicating a preferred antenna configuration for a retransmission of the downlink data transmission associated with the second result. In some aspects, the preferred antenna configuration indicates a preferred antenna panel or a preferred beam for the retransmission.

At 650, the UE may optionally receive a retransmission of the downlink data transmission prior to the second uplink channel based at least in part on the first feedback. For example, the UE (e.g., using antenna 252, DEMOD 254, MIMO detector 256, receive processor 258, controller/processor 280, and/or the like) may receive a retransmission of the downlink data transmission prior to transmitting the second uplink channel based at least in part on the first feedback. The UE may receive the retransmission based at least in part on soft reporting information transmitted by the UE and/or based at least in part on the first feedback.

At 660, the UE may selectively transmit second feedback on the second uplink channel based at least in part on a second result of demodulating the downlink data transmission. For example, the UE (e.g., using controller/processor 280, transmit processor 264, TX MIMO processor 266, MOD 254, antenna 252, and/or the like) may selectively transmit second feedback on the second uplink channel based at least in part on a second result of demodulating the downlink data transmission, as described above in connection with second feedback 560 of FIG. 5 on the second PUCCH resource 430 of FIG. 4. In some aspects, the second result may relate to a second attempt to demodulate or decode the downlink data transmission as received via a second set of antennas. For example, in some aspects, the first set of antennas may be a preferred set of antennas for decoding the downlink data transmission, and the second set of antennas may be a non-preferred set of antennas. If decoding the downlink data transmission as received via the first set of antennas, the UE may "fall back" to decoding the downlink transmission as received via the second set of antennas, and may provide second feedback on the second uplink channel. Thus, the usage of the second uplink channel may enable the successive decoding attempts described herein. In some aspects, the UE may not transmit the second feedback if the UE transmits successful feedback, such as an ACK, as part of the first feedback.

In some aspects, selectively transmitting the second feedback includes transmitting the second feedback based at least in part on the first result of demodulating the downlink data transmission being unsuccessful. In some aspects, the second result is based at least in part on a second attempt at demodulating the downlink data transmission, and the second attempt is based at least in part on the first result being an unsuccessful result.

In some aspects, the first result is based at least in part on the UE attempting to demodulate the downlink data transmission as received via a first antenna set, and the second result is based at least in part on attempting to demodulate the downlink data transmission as received via a second antenna set. In some aspects, the first antenna set includes a first antenna panel and the second antenna set includes a second antenna panel. In some aspects, the first feedback includes reporting information for the second antenna set.

In some aspects, the reporting information for the second antenna set includes a plurality of bits that indicate a quality of a set of least likelihood ratios for the downlink data transmission as received via the second antenna set. In some aspects, the first result is based at least in part on a first set of least likelihood ratios determined using the first antenna set, and the second result is based at least in part on a second set of least likelihood ratios determined using the second antenna set. In some aspects, the first feedback and the second feedback are associated with a same transport block or a same set of code block groups of the downlink data transmission.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
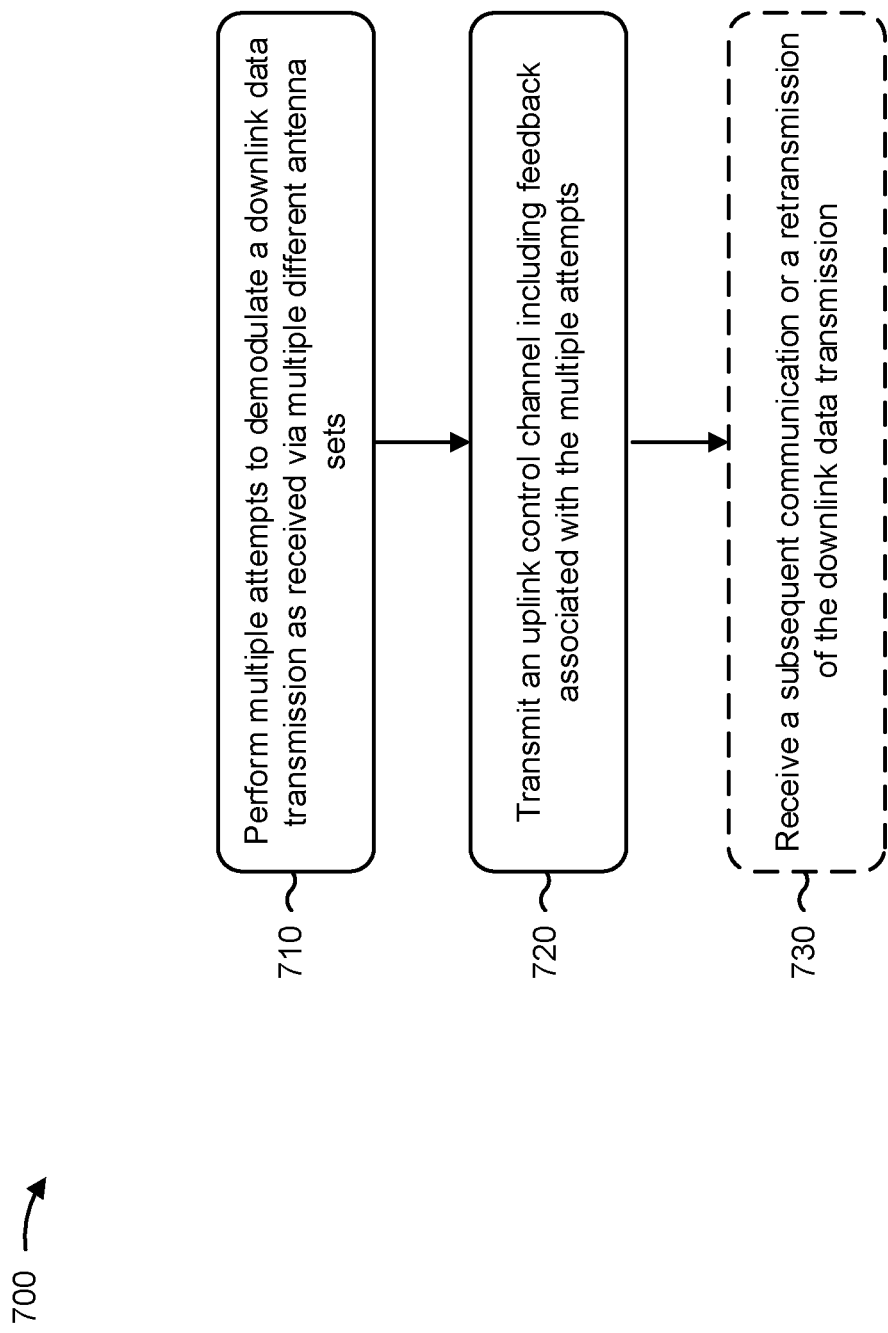

FIG. 7 is a flowchart of an example method 700 of wireless communication. The method 700 may be performed by, for example, a UE (e.g., UE 120 and/or the like).

At 710, the UE may perform multiple attempts to demodulate a downlink data transmission as received via multiple different antenna sets. For example, the UE (e.g., using antenna 252, DEMOD 254, MIMO detector 256, receive processor 258, controller/processor 280, and/or the like) may perform multiple attempts to demodulate a downlink data transmission as received via multiple different antenna sets, as described above in connection with FIG. 5 and at 530 and 540. In some aspects, the multiple attempts result in sets of least likelihood ratios determined based at least in part on the multiple different antenna sets. In some aspects, a set of least likelihood ratios, of the sets of least likelihood ratios, is determined based at least in part on a combination of two or more of the multiple different antenna sets. In some aspects, the multiple different antenna sets comprise a first subset of antennas of the UE and a second subset of antennas of the UE. In some aspects, an antenna set, of the multiple different antenna sets, comprises a combination of the first subset and the second subset. In some aspects, the feedback associated with the multiple attempts includes multiple bits that indicate a quality of one or more sets of least likelihood ratios associated with the multiple attempts.

At 720, the UE may transmit an uplink control channel including feedback associated with the multiple attempts. For example, the UE (e.g., using controller/processor 280, transmit processor 264, TX MIMO processor 266, MOD 254, antenna 252, and/or the like) may transmit an uplink control channel including feedback associated with the multiple attempts, as described above in connection with FIG. 5 and at 550 and 560. In some aspects, the feedback indicates respective results of the multiple attempts and information associated with the multiple attempts. The information associated with the multiple attempts may include soft reporting information.

At 730, the UE may optionally receive a subsequent communication or a retransmission of the downlink data transmission. For example, the UE (e.g., using antenna 252, DEMOD 254, MIMO detector 256, receive processor 258, controller/processor 280, and/or the like) may receive a subsequent communication or a retransmission of the downlink data transmission. In some aspects, the subsequent communication or the retransmission is based at least in part on the information associated with the multiple attempts, such as the soft reporting information.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
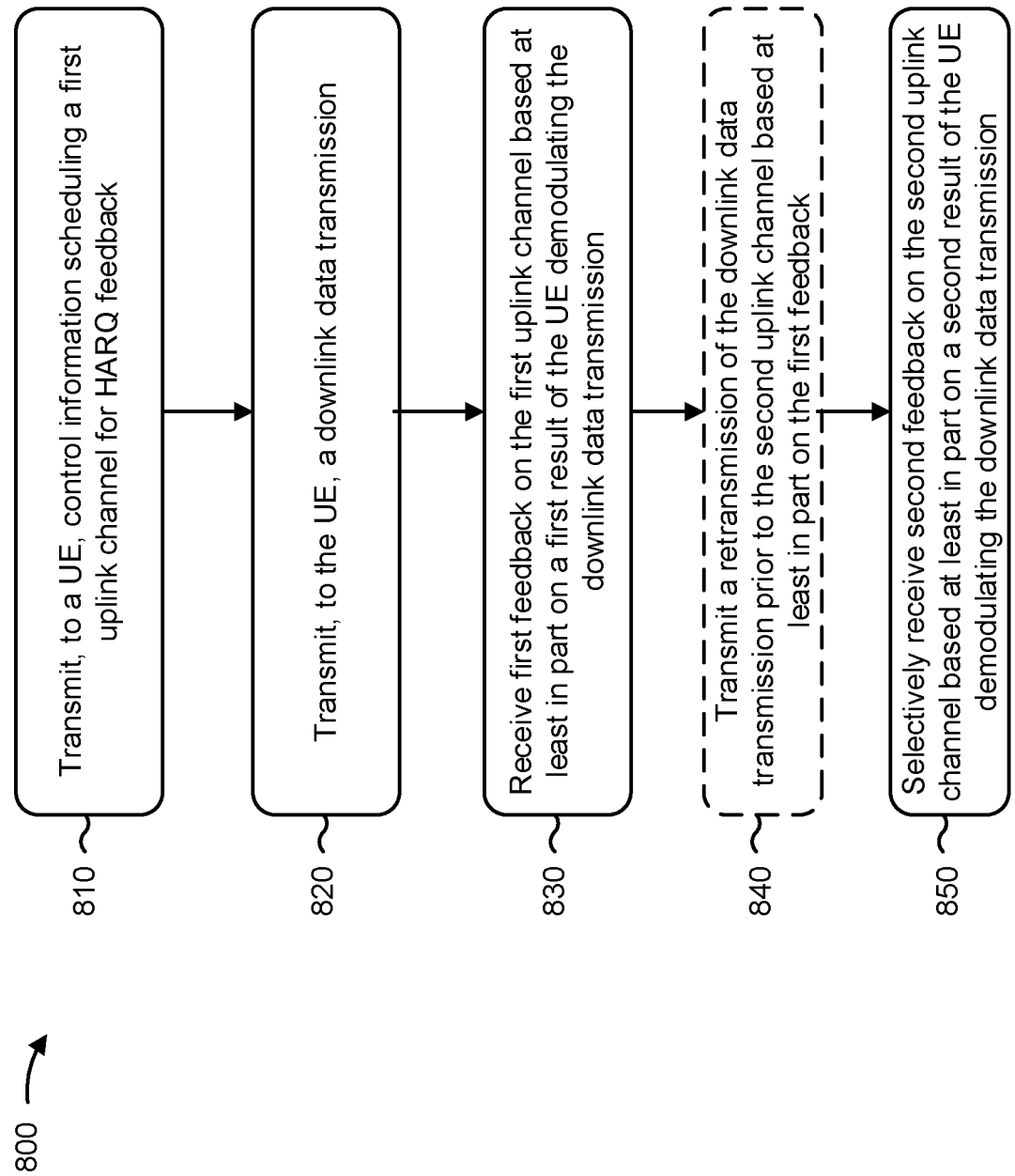

FIG. 8 is a flowchart of an example method 800 of wireless communication. The method 800 may be performed by, for example, a base station (e.g., base station 110 and/or the like).

At 810, the base station may transmit, to a UE, control information scheduling a first uplink channel for HARQ feedback. For example, the base station (e.g., using controller/processor 240, transmit processor 220, TX MIMO processor 230, MOD 232, antenna 234, and/or the like) may transmit, to a UE, control information scheduling a first uplink channel for HARQ feedback, as described above in connection with PDCCH 510 of FIG. 5 and PDCCH 410 of FIG. 4. In some aspects, the first uplink channel is associated with a second uplink channel for HARQ feedback subsequent to the first uplink channel.

In some aspects, the control information indicates a location of the second uplink channel. In some aspects, a location of the second uplink channel is based at least in part on a configured time offset from the first uplink channel. In some aspects, the second uplink channel is shared between multiple UEs including the UE.

At 820, the base station may transmit, to the UE, a downlink data transmission. For example, the base station (e.g., using controller/processor 240, transmit processor 220, TX MIMO processor 230, MOD 232, antenna 234, and/or the like) may transmit, to the UE, a downlink data transmission, as described above in connection with PDSCH 520 of FIG. 5 or PDSCH 460 of FIG. 4.

At 830, the base station may receive first feedback on the first uplink channel based at least in part on a first result of the UE demodulating the downlink data transmission. For example, the base station (e.g., using antenna 234, DEMOD 232, MIMO detector 236, receive processor 238, controller/processor 240, and/or the like) may receive first feedback on the first uplink channel based at least in part on a first result of the UE demodulating the downlink data transmission, as described above in connection with the first feedback 550 of FIG. 5. In some aspects, the base station may receive the first feedback on the first PUCCH resource 420 of FIG. 4.

At 840, the base station may optionally transmit a retransmission of the downlink data transmission prior to the second uplink channel based at least in part on the first feedback. For example, the base station (e.g., using controller/processor 240, transmit processor 220, TX MIMO processor 230, MOD 232, antenna 234, and/or the like) may transmit a retransmission of the downlink data transmission prior to the second uplink channel based at least in part on the first feedback. In some aspects, the base station may transmit the retransmission based at least in part on the first feedback being early HARQ feedback (e.g., an early HARQ-NACK). In some aspects, the first feedback indicates one or more transmission configuration indicator (TCI) states of one or more beams for a retransmission of the downlink data transmission, and method 800 includes a retransmission of the downlink data transmission or a subsequent transmission using the one or more TCI states. In some aspects, the first feedback includes information indicating a preferred antenna configuration for a retransmission of the downlink data transmission associated with the second result. In some aspects, the preferred antenna configuration indicates a preferred antenna panel or a preferred beam for the retransmission.

At 850, the base station may selectively receive second feedback on the second uplink channel based at least in part on a second result of the UE demodulating the downlink data transmission. For example, the base station (e.g., using antenna 234, DEMOD 232, MIMO detector 236, receive processor 238, controller/processor 240, and/or the like) may selectively receive second feedback on the second uplink channel based at least in part on a second result of the UE demodulating the downlink data transmission, as described above in connection with the second feedback 560 of FIG. 5. In some aspects, the base station may not receive the second feedback if the first feedback indicates a successful result. In some aspects, selectively receiving the second feedback is based at least in part on whether the first result of demodulating the downlink data transmission is successful. In some aspects, selectively receiving the second feedback includes receiving the second feedback based at least in part on the first result of demodulating the downlink data transmission being unsuccessful. In some aspects, the first feedback and the second feedback are associated with a same transport block or a same set of code block groups of the downlink data transmission.

In some aspects, the first result is based at least in part on attempting to demodulate the downlink data transmission as received via a first antenna set, and the second result is based at least in part on attempting to demodulate the downlink data transmission as received via a second antenna set. In some aspects, the first antenna set includes a first antenna panel and the second antenna set includes a second antenna panel. In some aspects, the first feedback includes reporting information for the second antenna set. In some aspects, the reporting information for the second antenna set includes a plurality of bits that indicate a quality of a set of least likelihood ratios for the downlink data transmission as received via the second antenna set. In some aspects, the first result is based at least in part on a first set of least likelihood ratios determined using the first antenna set, and the second result is based at least in part on a second set of least likelihood ratios determined using the second antenna set.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
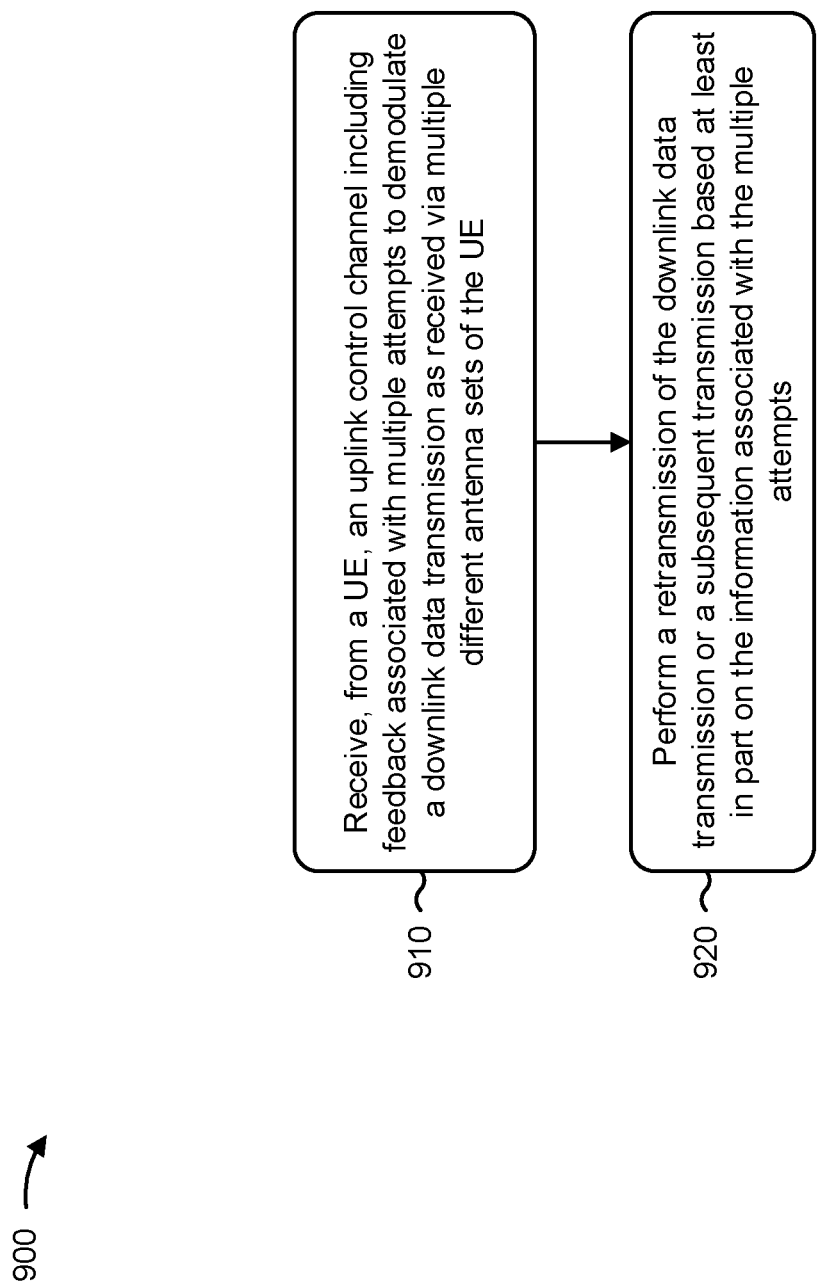

FIG. 9 is a flowchart of an example method 900 of wireless communication. The method 900 may be performed by, for example, a base station (e.g., base station 110 and/or the like).

At 910, the base station may receive, from a UE, an uplink control channel including feedback associated with multiple attempts to demodulate a downlink data transmission as received via multiple different antenna sets of the UE. For example, the base station (e.g., using antenna 234, DEMOD 232, MIMO detector 236, receive processor 238, controller/processor 240, and/or the like) may receive, from a UE, an uplink control channel including feedback associated with multiple attempts to demodulate a downlink data transmission as received via multiple different antenna sets of the UE. The feedback may comprise the first feedback 550 and the second feedback 560 of FIG. 5. The multiple attempts are shown at 530 and 540 of FIG. 5. In some aspects, the feedback indicates respective results of the multiple attempts and information associated with the multiple attempts. In some aspects, the multiple attempts are associated with multiple sets of least likelihood ratios determined based at least in part on the multiple different antenna sets. In some aspects, a set of least likelihood ratios, of the sets of least likelihood ratios, is determined based at least in part on a combination of two or more of the multiple different antenna sets. In some aspects, the multiple different antenna sets comprise a first subset of antennas of the UE and a second subset of antennas of the UE. In some aspects, an antenna set, of the multiple different antenna sets, comprises a combination of the first subset and the second subset. In some aspects, the feedback associated with the multiple attempts includes multiple bits that indicate a quality of one or more sets of least likelihood ratios associated with the multiple attempts.

At 920, the base station may perform a retransmission of the downlink data transmission or a subsequent transmission based at least in part on the information associated with the multiple attempts. For example, the base station (e.g., using controller/processor 240, transmit processor 220, TX MIMO processor 230, MOD 232, antenna 234, and/or the like) may perform a retransmission of the downlink data transmission or a subsequent transmission based at least in part on the information associated with the multiple attempts, as described above in connection with the retransmission 570 shown in FIG. 5. In some aspects, a power allocation, a modulation and coding scheme, or a redundancy version configuration of the retransmission or the subsequent transmission is based at least in part on the feedback.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

Figure 10:
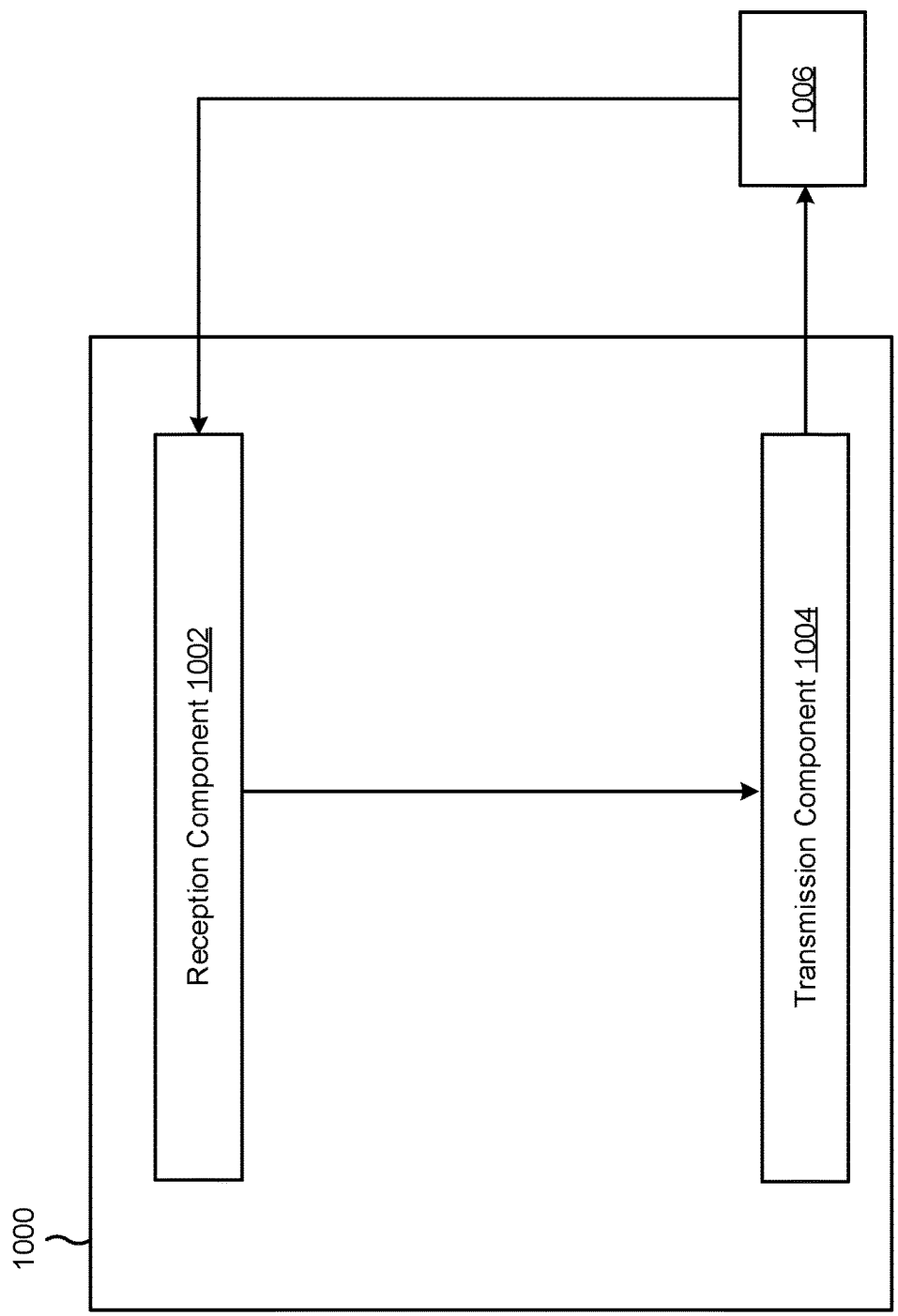
FIG. 10 is a block diagram of an example apparatus for wireless communication.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 3-9. Additionally or alternatively, the apparatus 1000 may be configured to perform one or more processes described herein, such as method 600 of FIG. 6. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive control information scheduling a first uplink channel for HARQ feedback, wherein the first uplink channel is associated with a second uplink channel for HARQ feedback subsequent to the first uplink channel. The reception component 1002 may also receive a downlink data transmission. The reception component 1002 may also receive a retransmission of the downlink data transmission prior to the second uplink channel based at least in part on the first feedback. The transmission component 1004 may transmit first feedback on the first uplink channel based at least in part on a first result of demodulating the downlink data transmission. The transmission component 1004 may selectively transmit second feedback on the second uplink channel based at least in part on a second result of demodulating the downlink data transmission.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
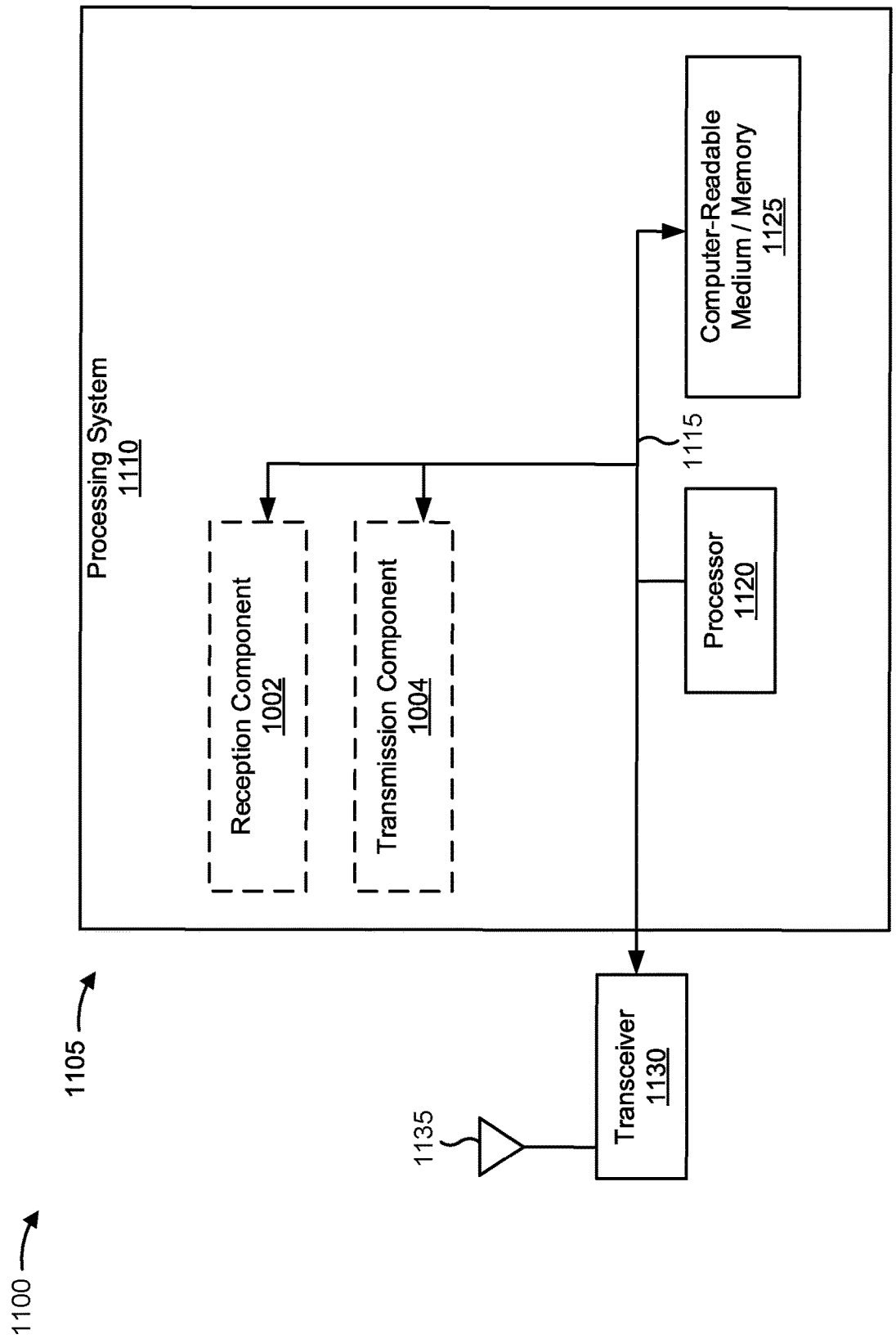
FIG. 11 is a diagram illustrating an example of a hardware implementation for an apparatus employing a processing system.

FIG. 11 is a diagram illustrating an example 1100 of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for means for receiving control information scheduling a first uplink channel for HARQ feedback, wherein the first uplink channel is associated with a second uplink channel for HARQ feedback subsequent to the first uplink channel; means for receiving a downlink data transmission; means for transmitting first feedback on the first uplink channel based at least in part on a first result of demodulating the downlink data transmission; and means for selectively transmitting second feedback on the second uplink channel based at least in part on a second result of demodulating the downlink data transmission. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
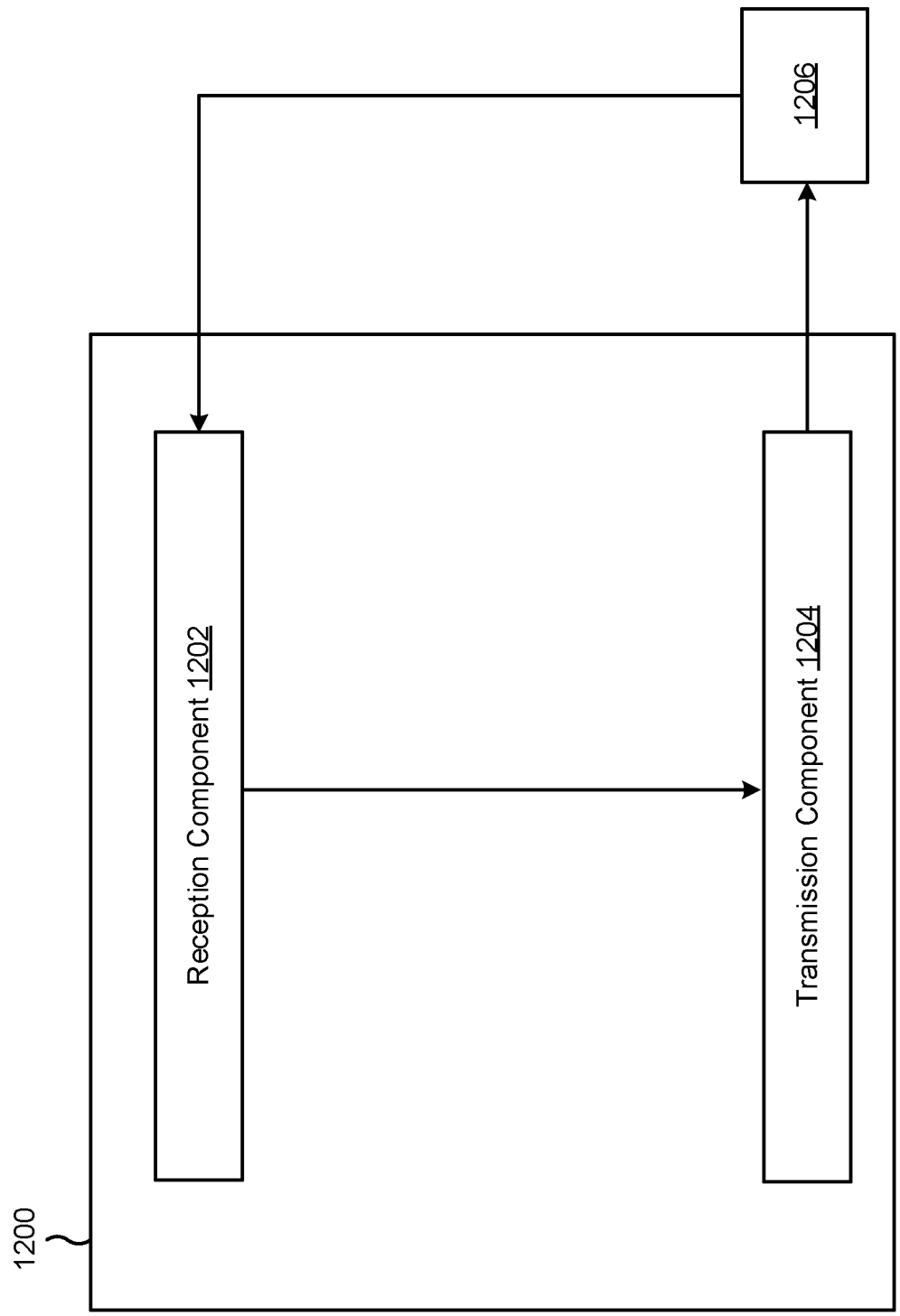
FIG. 12 is a block diagram of an example apparatus for wireless communication.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 3-9. Additionally or alternatively, the apparatus 1200 may be configured to perform one or more processes described herein, such as method 700 of FIG. 7. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may perform multiple attempts to demodulate a downlink data transmission as received via multiple different antenna sets. In some aspects, the reception component 1202 may receive a subsequent communication or a retransmission of the downlink data transmission, wherein the subsequent communication or the retransmission is based at least in part on the information associated with the multiple attempts. The transmission component 1204 may transmit an uplink control channel including feedback associated with the multiple attempts, wherein the feedback indicates respective results of the multiple attempts and information associated with the multiple attempts.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
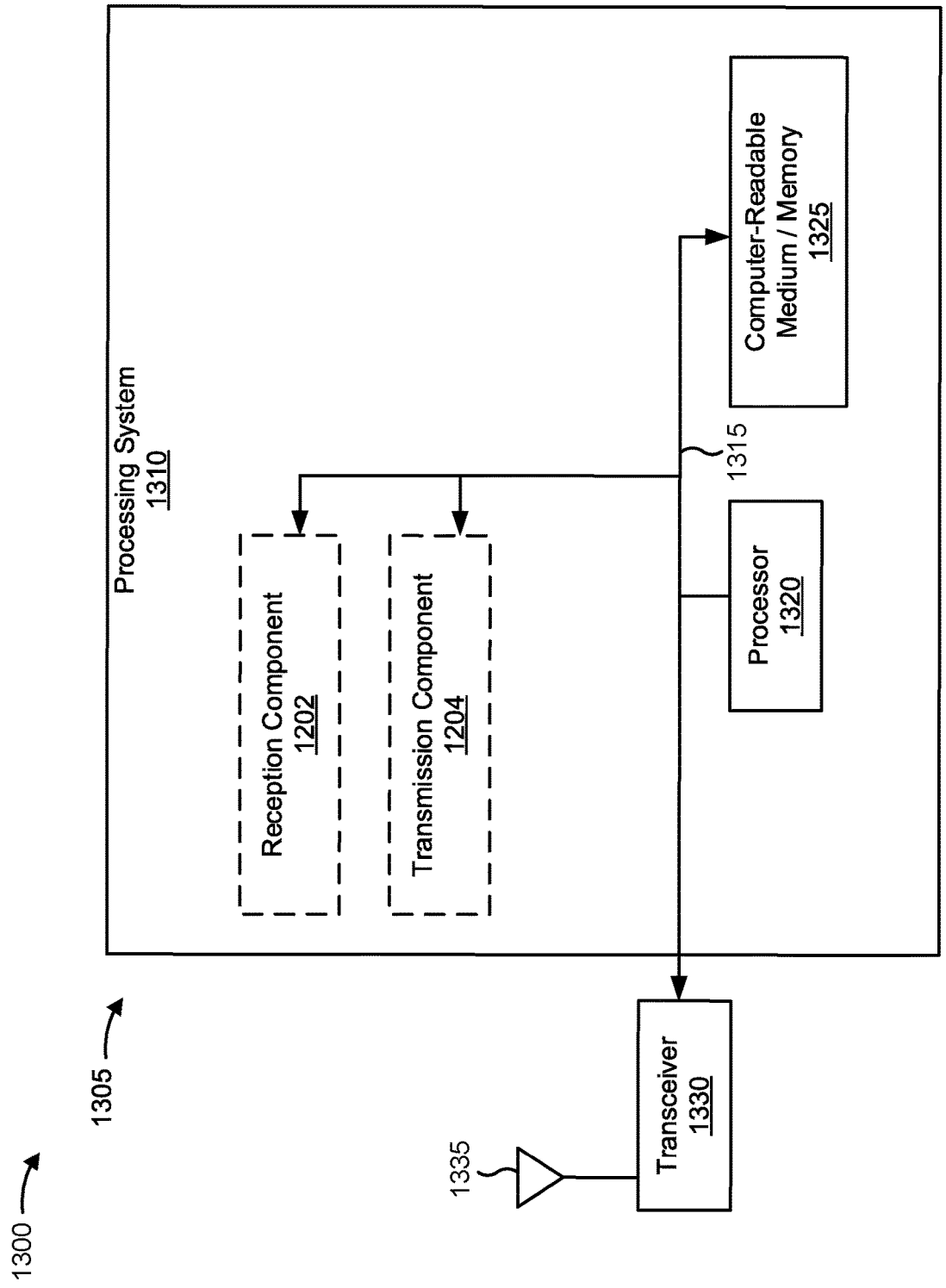
FIG. 13 is a diagram illustrating an example of a hardware implementation for an apparatus employing a processing system.

FIG. 13 is a diagram illustrating an example 1300 of a hardware implementation for an apparatus 1305 employing a processing system 1310. The apparatus 1305 may be a UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, power management circuits, and/or the like.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication includes means for means for performing multiple attempts to demodulate a downlink data transmission as received via multiple different antenna sets; and means for transmitting an uplink control channel including feedback associated with the multiple attempts, wherein the feedback indicates respective results of the multiple attempts and information associated with the multiple attempts. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
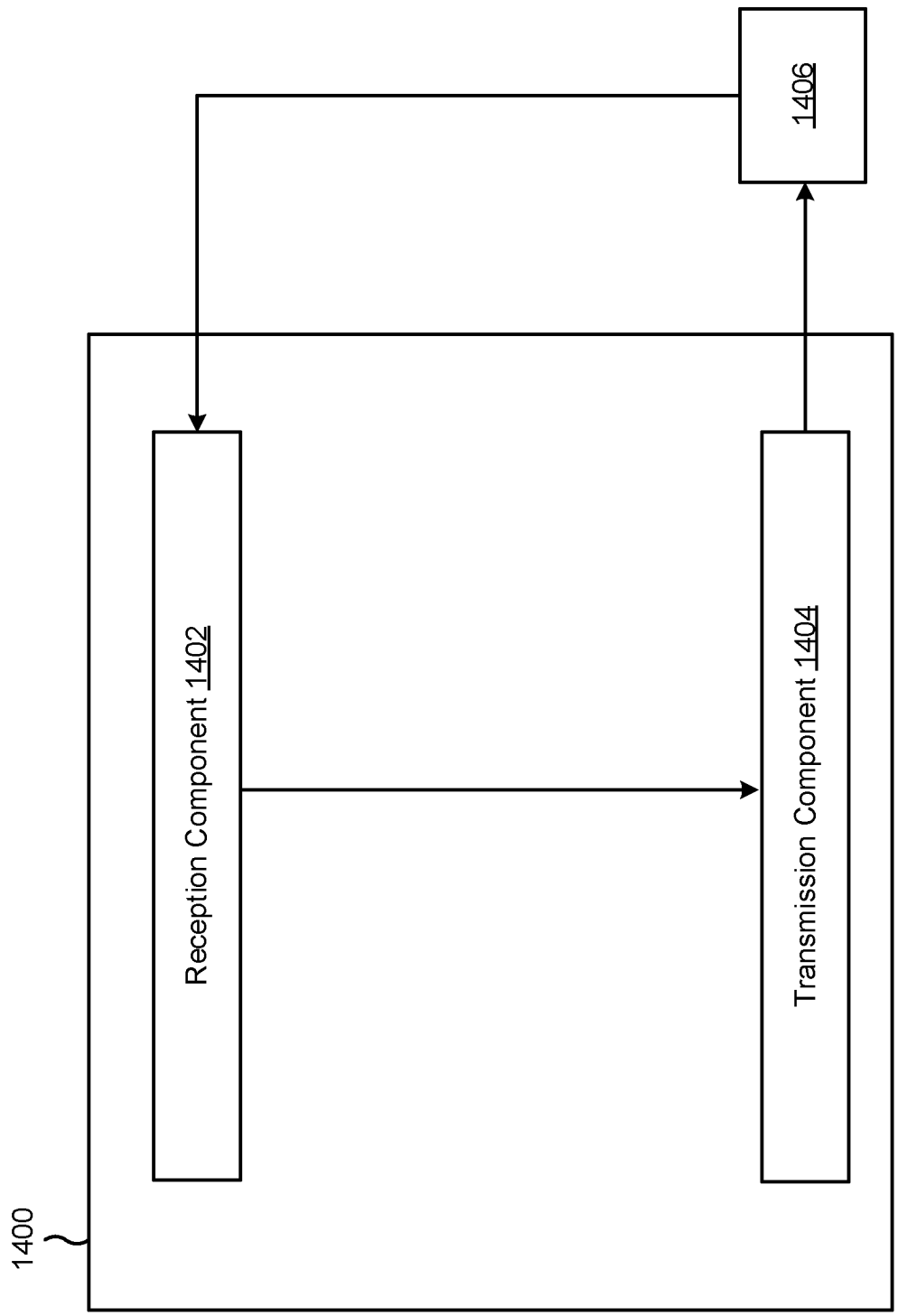
FIG. 14 is a block diagram of an example apparatus for wireless communication.

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 3-9. Additionally or alternatively, the apparatus 1400 may be configured to perform one or more processes described herein, such as method 800 of FIG. 8. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The transmission component 1404 may transmit, to the UE, a downlink data transmission. The transmission component 1404 may transmit a retransmission of the downlink data transmission prior to the second uplink channel based at least in part on the first feedback. The transmission component 1404 may perform a retransmission of the downlink data transmission or a subsequent transmission using the one or more TCI states. The reception component 1402 may receive first feedback on the first uplink channel based at least in part on a first result of the UE demodulating the downlink data transmission. The reception component 1402 may selectively receive second feedback on the second uplink channel based at least in part on a second result of the UE demodulating the downlink data transmission. The transmission component 1404 may transmit, to a UE, control information scheduling a first uplink channel for HARQ feedback, wherein the first uplink channel is associated with a second uplink channel for HARQ feedback subsequent to the first uplink channel.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
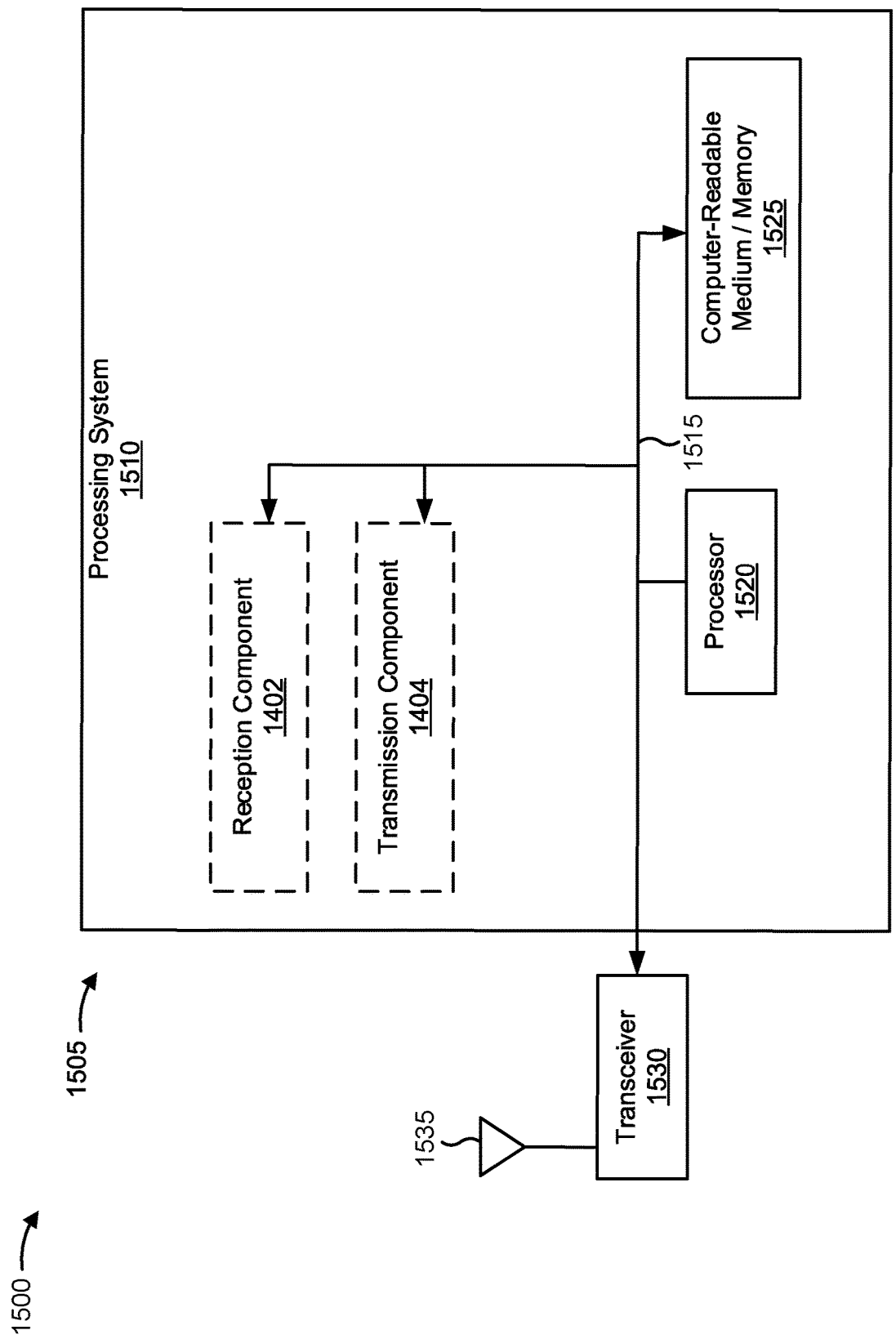
FIG. 15 is a diagram illustrating an example of a hardware implementation for an apparatus employing a processing system.

FIG. 15 is a diagram illustrating an example 1500 of a hardware implementation for an apparatus 1505 employing a processing system 1510. The apparatus 1505 may be a base station.

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor 1520, the illustrated components, and the computer-readable medium/memory 1525. The bus 1515 may also link various other circuits, such as timing sources, peripherals, voltage regulators, power management circuits, and/or the like.

The processing system 1510 may be coupled to a transceiver 1530. The transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1404, and generates a signal to be applied to the one or more antennas 1535 based at least in part on the received information.

The processing system 1510 includes a processor 1520 coupled to a computer-readable medium/memory 1525. The processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. The components may be software modules running in the processor 1520, resident/stored in the computer readable medium/memory 1525, one or more hardware modules coupled to the processor 1520, or some combination thereof.

In some aspects, the processing system 1510 may be a component of the base station 110 and may include the memory 242 and/or at least one of the TX MIMO processor 230, the RX processor 238, and/or the controller/processor 240. In some aspects, the apparatus 1505 for wireless communication includes means for means for means for transmitting, to a UE, control information scheduling a first uplink channel for HARQ feedback, wherein the first uplink channel is associated with a second uplink channel for HARQ feedback subsequent to the first uplink channel; means for transmitting, to the UE, a downlink data transmission; means for receiving first feedback on the first uplink channel based at least in part on a first result of the UE demodulating the downlink data transmission; and means for selectively receiving second feedback on the second uplink channel based at least in part on a second result of the UE demodulating the downlink data transmission. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
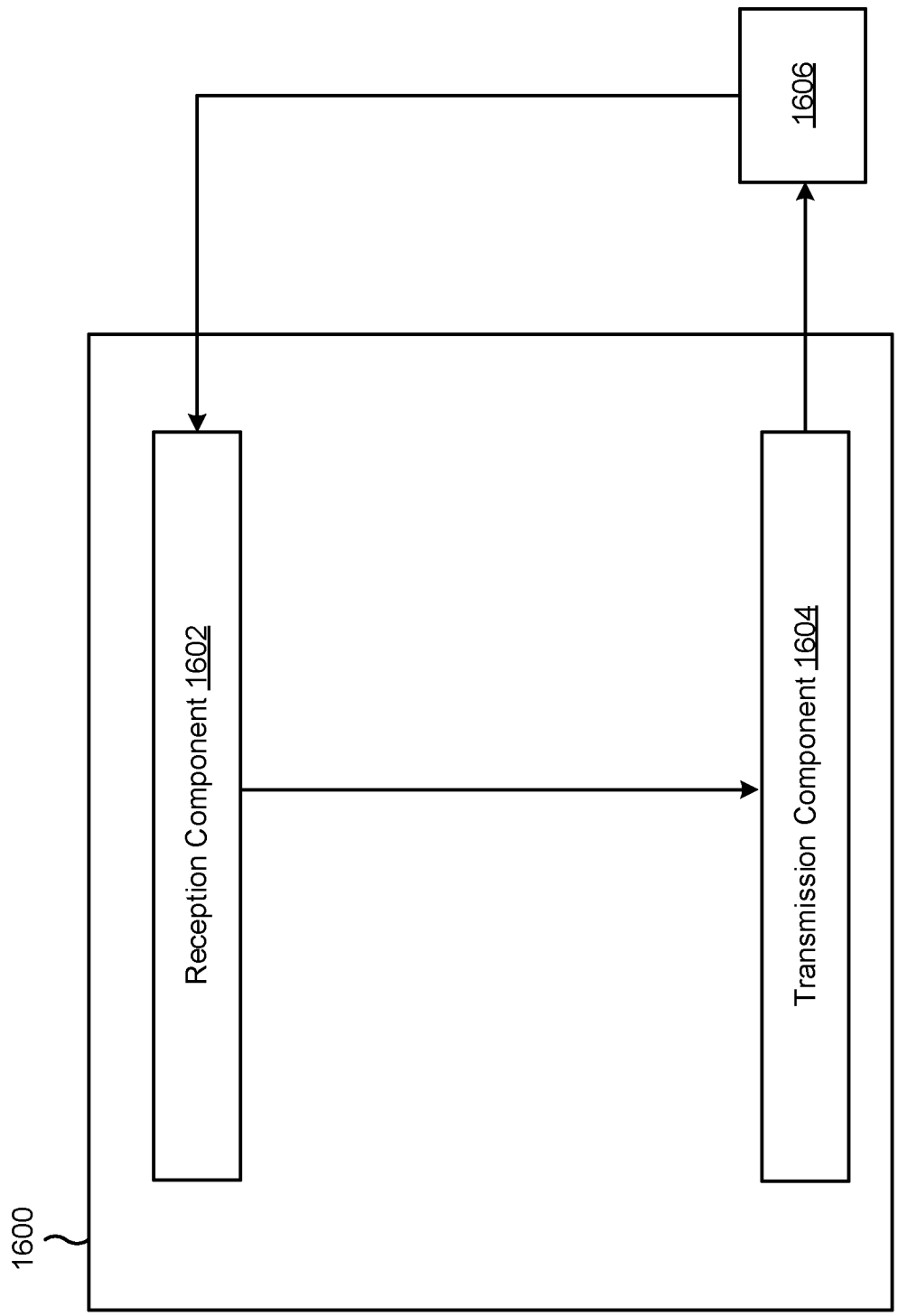
FIG. 16 is a block diagram of an example apparatus for wireless communication.

FIG. 16 is a block diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604.

In some aspects, the apparatus 1600 may be configured to perform one or more operations described herein in connection with FIGS. 3-9. Additionally or alternatively, the apparatus 1600 may be configured to perform one or more processes described herein, such as method 900 of FIG. 9, or a combination thereof. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The reception component 1602 may receive, from a UE, an uplink control channel including feedback associated with multiple attempts to demodulate a downlink data transmission as received via multiple different antenna sets of the UE, wherein the feedback indicates respective results of the multiple attempts and information associated with the multiple attempts. The transmission component 1604 may perform a retransmission of the downlink data transmission or a subsequent transmission based at least in part on the information associated with the multiple attempts.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
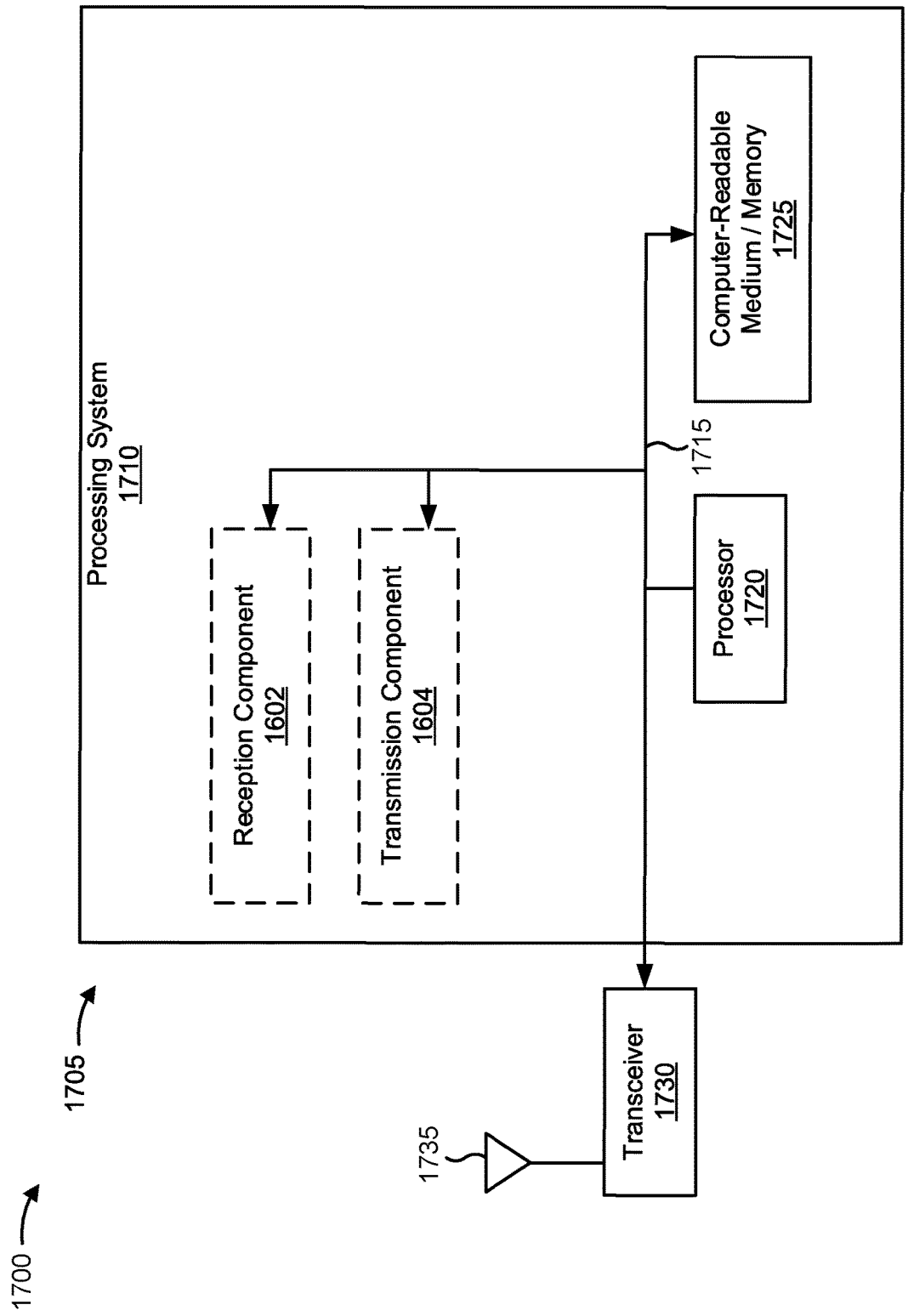
FIG. 17 is a diagram illustrating an example of a hardware implementation for an apparatus employing a processing system.

FIG. 17 is a diagram illustrating an example 1700 of a hardware implementation for an apparatus 1705 employing a processing system 1710. The apparatus 1705 may be a base station.

The processing system 1710 may be implemented with a bus architecture, represented generally by the bus 1715. The bus 1715 may include any number of interconnecting buses and bridges depending on the specific application of the processing system 1710 and the overall design constraints. The bus 1715 links together various circuits including one or more processors and/or hardware components, represented by the processor 1720, the illustrated components, and the computer-readable medium/memory 1725. The bus 1715 may also link various other circuits, such as timing sources, peripherals, voltage regulators, power management circuits, and/or the like.

The processing system 1710 may be coupled to a transceiver 1730. The transceiver 1730 is coupled to one or more antennas 1735. The transceiver 1730 provides a means for communicating with various other apparatuses over a transmission medium. The transceiver 1730 receives a signal from the one or more antennas 1735, extracts information from the received signal, and provides the extracted information to the processing system 1710, specifically the reception component 1602. In addition, the transceiver 1730 receives information from the processing system 1710, specifically the transmission component 1604, and generates a signal to be applied to the one or more antennas 1735 based at least in part on the received information.

The processing system 1710 includes a processor 1720 coupled to a computer-readable medium/memory 1725. The processor 1720 is responsible for general processing, including the execution of software stored on the computer-readable medium/memory 1725. The software, when executed by the processor 1720, causes the processing system 1710 to perform the various functions described herein for any particular apparatus. The computer-readable medium/memory 1725 may also be used for storing data that is manipulated by the processor 1720 when executing software. The processing system further includes at least one of the illustrated components. The components may be software modules running in the processor 1720, resident/stored in the computer readable medium/memory 1725, one or more hardware modules coupled to the processor 1720, or some combination thereof.

In some aspects, the processing system 1710 may be a component of the base station 110 and may include the memory 242 and/or at least one of the TX MIMO processor 230, the RX processor 238, and/or the controller/processor 240. In some aspects, the apparatus 1705 for wireless communication includes means for means for receiving, from a UE, an uplink control channel including feedback associated with multiple attempts to demodulate a downlink data transmission as received via multiple different antenna sets of the UE, wherein the feedback indicates respective results of the multiple attempts and information associated with the multiple attempts; and means for performing a retransmission of the downlink data transmission or a subsequent transmission based at least in part on the information associated with the multiple attempts. The aforementioned means may be one or more of the aforementioned components of the apparatus 1600 and/or the processing system 1710 of the apparatus 1705 configured to perform the functions recited by the aforementioned means. As described elsewhere herein, the processing system 1710 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 17 is provided as an example. Other examples may differ from what is described in connection with FIG. 17.

The following provides an overview of some Aspects of the present disclosure:

Aspect 1: A method of wireless communication performed by a user equipment (UE), comprising: receiving control information scheduling a first uplink channel for hybrid automatic repeat request (HARQ) feedback, wherein the first uplink channel is associated with a second uplink channel for HARQ feedback subsequent to the first uplink channel; receiving a downlink data transmission; transmitting first feedback on the first uplink channel based at least in part on a first result of demodulating the downlink data transmission; and selectively transmitting second feedback on the second uplink channel based at least in part on a second result of demodulating the downlink data transmission.

Aspect 2: The method of Aspect 1, wherein the first result is based at least in part on attempting to demodulate the downlink data transmission as received via a first antenna set, and the second result is based at least in part on attempting to demodulate the downlink data transmission as received via a second antenna set.

Aspect 3: The method of Aspect 2, wherein the first antenna set includes a first antenna panel and the second antenna set includes a second antenna panel.

Aspect 4: The method of Aspect 2, wherein the first feedback includes reporting information for the second antenna set.

Aspect 5: The method of Aspect 4, wherein the reporting information for the second antenna set includes a plurality of bits that indicate a quality of a set of least likelihood ratios for the downlink data transmission as received via the second antenna set.

Aspect 6: The method of Aspect 2, wherein the first result is based at least in part on a first set of least likelihood ratios determined using the first antenna set, and the second result is based at least in part on a second set of least likelihood ratios determined using the second antenna set.

Aspect 7: The method of Aspect 2, wherein the first feedback indicates one or more transmission configuration indicator (TCI) states of one or more beams for a retransmission of the downlink data transmission.

Aspect 8: The method of any of Aspects 1-7, wherein the control information indicates a location of the second uplink channel.

Aspect 9: The method of any of Aspects 1-8, wherein a location of the second uplink channel is based at least in part on a configured time offset from the first uplink channel.

Aspect 10: The method of any of Aspects 1-9, wherein the second uplink channel is shared between multiple UEs including the UE.

Aspect 11: The method of any of Aspects 1-10, further comprising: receiving a retransmission of the downlink data transmission prior to the second uplink channel based at least in part on the first feedback.

Aspect 12: The method of any of Aspects 1-11, wherein selectively transmitting the second feedback is based at least in part on whether the first result of demodulating the downlink data transmission is successful.

Aspect 13: The method of Aspect 12, wherein selectively transmitting the second feedback includes transmitting the second feedback based at least in part on the first result of demodulating the downlink data transmission being unsuccessful.

Aspect 14: The method of any of Aspects 1-13, wherein the second result is based at least in part on a second attempt at demodulating the downlink data transmission, wherein the second attempt is based at least in part on the first result being an unsuccessful result.

Aspect 15: The method of any of Aspects 1-14, wherein the first feedback includes information indicating a preferred antenna configuration for a retransmission of the downlink data transmission associated with the second result.

Aspect 16: The method of Aspect 15, wherein the preferred antenna configuration indicates a preferred antenna panel or a preferred beam for the retransmission.

Aspect 17: The method of any of Aspects 1-16, wherein the first feedback and the second feedback are associated with a same transport block or a same set of code block groups of the downlink data transmission.

Aspect 18: The method of any of Aspects 1-17, further comprising: transmitting capability information indicating support for transmitting the first feedback on the first channel and the second feedback on the second channel, wherein the second uplink channel is provided for the UE based at least in part on the capability information.

Aspect 19: A method of wireless communication performed by a base station, comprising: transmitting, to a user equipment (UE), control information scheduling a first uplink channel for hybrid automatic repeat request (HARQ) feedback, wherein the first uplink channel is associated with a second uplink channel for HARQ feedback subsequent to the first uplink channel; transmitting, to the UE, a downlink data transmission; receiving first feedback on the first uplink channel based at least in part on a first result of the UE demodulating the downlink data transmission; and selectively receiving second feedback on the second uplink channel based at least in part on a second result of the UE demodulating the downlink data transmission.

Aspect 20: The method of Aspect 19, wherein the control information indicates a location of the second uplink channel.

Aspect 21: The method of any of Aspects 19-20, wherein a location of the second uplink channel is based at least in part on a configured time offset from the first uplink channel.

Aspect 22: The method of any of Aspects 19-21, wherein the second uplink channel is shared between multiple UEs including the UE.

Aspect 23: The method of any of Aspects 19-22, further comprising: transmitting a retransmission of the downlink data transmission prior to the second uplink channel based at least in part on the first feedback.

Aspect 24: The method of any of Aspects 19-23, wherein selectively receiving the second feedback is based at least in part on whether the first result of demodulating the downlink data transmission is successful.

Aspect 25: The method of Aspect 24, wherein selectively receiving the second feedback includes receiving the second feedback based at least in part on the first result of demodulating the downlink data transmission being unsuccessful.

Aspect 26: The method of any of Aspects 19-25, wherein the second result is based at least in part on a second attempt at demodulating the downlink data transmission, wherein the second attempt is based at least in part on the first result being an unsuccessful result.

Aspect 27: The method of any of Aspects 19-26, wherein the first result is based at least in part on attempting to demodulate the downlink data transmission as received via a first antenna set, and the second result is based at least in part on attempting to demodulate the downlink data transmission as received via a second antenna set.

Aspect 28: The method of Aspect 27, wherein the first antenna set includes a first antenna panel and the second antenna set includes a second antenna panel.

Aspect 29: The method of Aspect 27, wherein the first feedback includes reporting information for the second antenna set.

Aspect 30: The method of Aspect 29, wherein the reporting information for the second antenna set includes a plurality of bits that indicate a quality of a set of least likelihood ratios for the downlink data transmission as received via the second antenna set.

Aspect 31: The method of Aspect 27, wherein the first result is based at least in part on a first set of least likelihood ratios determined using the first antenna set, and the second result is based at least in part on a second set of least likelihood ratios determined using the second antenna set.

Aspect 32: The method of Aspect 27, wherein the first feedback indicates one or more transmission configuration indicator (TCI) states of one or more beams for a retransmission of the downlink data transmission, and wherein the method further comprises: retransmitting of the downlink data transmission or a subsequent transmission using the one or more TCI states.

Aspect 33: The method of any of Aspects 19-32, wherein the first feedback includes information indicating a preferred antenna configuration for a retransmission of the downlink data transmission associated with the second result.

Aspect 34: The method of Aspect 33, wherein the preferred antenna configuration indicates a preferred antenna panel or a preferred beam for the retransmission.

Aspect 35: The method of any of Aspects 19-34, wherein the first feedback and the second feedback are associated with a same transport block or a same set of code block groups of the downlink data transmission.

Aspect 36: The method of any of Aspects 19-35, further comprising: receiving capability information indicating support for the UE transmitting the first feedback on the first channel and the second feedback on the second channel; and providing a resource for the second uplink channel based at least in part on the capability information.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors coupled to the memory, wherein the one or more processors are configured to:
receive control information scheduling a first uplink channel for hybrid automatic repeat request (HARQ) feedback;
receive a downlink data transmission;
transmit first feedback on the first uplink channel based at least in part on a first result of demodulating the downlink data transmission, wherein the first feedback includes a negative acknowledgement and soft reporting information associated with decoding or reception of the downlink data transmission; and
transmit, based at least in part on the first feedback and a second result of demodulating the downlink data transmission, second feedback on a second uplink channel for HARQ feedback subsequent to the first uplink channel, wherein the first feedback and the second feedback are associated with a same transport block or a same set of code block groups of the downlink data transmission.

2. The apparatus of claim 1, further comprising a first antenna set and a second antenna set, wherein the one or more processors are configured to:
determine the first result based at least in part on attempting to demodulate the downlink data transmission as received via the first antenna set; and
determine the second result based at least in part on attempting to demodulate the downlink data transmission as received via the second antenna set.

3. The apparatus of claim 2, wherein the first antenna set includes a first antenna panel and the second antenna set includes a second antenna panel.

4. The apparatus of claim 2, wherein
the soft reporting information includes reporting information for the second antenna set.

5. The apparatus of claim 4, wherein the reporting information for the second antenna set includes a plurality of bits that indicate a quality of a set of least likelihood ratios for the downlink data transmission as received via the second antenna set.

6. The apparatus of claim 2, further comprising a multiple-input multiple-output (MIMO) detector, wherein one or more processors are configured to:
determine, using the MIMO detector, a first set of least likelihood ratios using the first antenna set and a second set of least likelihood ratios using the second antenna set, wherein the first result is based at least in part on the first set of least likelihood ratios and the second result is based at least in part on the second set of least likelihood ratios.

7. The apparatus of claim 2, wherein the first feedback indicates one or more transmission configuration indicator (TCI) states of one or more beams for a retransmission of the downlink data transmission.

8. The apparatus of claim 1, wherein the control information indicates a location of the second uplink channel.

9. The apparatus of claim 1, wherein a location of the second uplink channel is based at least in part on a configured time offset from the first uplink channel.

10. The apparatus of claim 1, wherein the second uplink channel is shared between multiple UEs including the UE.

11. The apparatus of claim 1, wherein the one or more processors are configured to:
receive a retransmission of the downlink data transmission prior to the second uplink channel based at least in part on the first feedback.

12. The apparatus of claim 1, wherein the one or more processors, to transmit the second feedback, are configured to:
transmit the second feedback based at least in part on the first result of demodulating the downlink data transmission being unsuccessful.

13. The apparatus of claim 1, wherein the one or more processors are configured to:
perform a second attempt at demodulating the downlink data transmission, wherein the second attempt is based at least in part on the first result being an unsuccessful result, and wherein the second result is based at least in part on the second attempt.

14. The apparatus of claim 1, wherein the first feedback includes information indicating a preferred antenna configuration for a retransmission of the downlink data transmission associated with the second result.

15. The apparatus of claim 14, wherein the preferred antenna configuration indicates a preferred antenna panel or a preferred beam for the retransmission.

16. A method of wireless communication performed by a user equipment (UE), comprising:
receiving control information scheduling a first uplink channel for hybrid automatic repeat request (HARQ) feedback;
receiving a downlink data transmission;
transmitting first feedback on the first uplink channel based at least in part on a first result of demodulating the downlink data transmission, wherein the first feedback includes a negative acknowledgement and soft reporting information associated with decoding or reception of the downlink data transmission; and transmitting, based at least in part on the first feedback and a second result of demodulating the downlink data transmission, second feedback on a second uplink channel for HARQ feedback subsequent to the first uplink channel, wherein the first feedback and the second feedback are associated with a same transport block or a same set of code block groups of the downlink data transmission.

17. The method of claim 16, wherein the first result is based at least in part on attempting to demodulate the downlink data transmission as received via a first antenna set, and the second result is based at least in part on attempting to demodulate the downlink data transmission as received via a second antenna set.

18. The method of claim 17, wherein the first antenna set includes a first antenna panel and the second antenna set includes a second antenna panel.

19. The method of claim 17, wherein the soft reporting information includes reporting information for the second antenna set.

20. The method of claim 19, wherein the reporting information for the second antenna set includes a plurality of bits that indicate a quality of a set of least likelihood ratios for the downlink data transmission as received via the second antenna set.

21. The method of claim 17, wherein the first result is based at least in part on a first set of least likelihood ratios determined using the first antenna set, and the second result is based at least in part on a second set of least likelihood ratios determined using the second antenna set.

22. The method of claim 17, wherein the first feedback indicates one or more transmission configuration indicator (TCI) states of one or more beams for a retransmission of the downlink data transmission.

23. A non-transitory computer-readable medium having a set of instructions stored thereon for wireless communication, that, when executed by an apparatus, causes the apparatus to:
  receive control information scheduling a first uplink channel for hybrid automatic repeat request (HARQ) feedback;
  receive a downlink data transmission;
  transmit first feedback on the first uplink channel based at least in part on a first result of demodulating the downlink data transmission, wherein the first feedback includes a negative acknowledgement and soft reporting information associated with decoding or reception of the downlink data transmission; and
  transmit, based at least in part on the first feedback and a second result of demodulating the downlink data transmission, second feedback on a second uplink channel for HARQ feedback subsequent to the first uplink channel, wherein the first feedback and the second feedback are associated with a same transport block or a same set of code block groups of the downlink data transmission.

24. The non-transitory computer-readable medium of claim 23, wherein the first result is based at least in part on attempting to demodulate the downlink data transmission as received via a first antenna set, and the second result is based at least in part on attempting to demodulate the downlink data transmission as received via a second antenna set.

25. The non-transitory computer-readable medium of claim 24, wherein the first antenna set includes a first antenna panel and the second antenna set includes a second antenna panel.

26. An apparatus for wireless communication, comprising:
  means for receiving control information scheduling a first uplink channel for hybrid automatic repeat request (HARQ) feedback;
  means for receiving a downlink data transmission;
  means for transmitting first feedback on the first uplink channel based at least in part on a first result of demodulating the downlink data transmission, wherein the first feedback includes a negative acknowledgement and soft reporting information associated with decoding or reception of the downlink data transmission; and
  means for transmitting, based at least in part on the first feedback and a second result of demodulating the downlink data transmission, second feedback on a second uplink channel for HARQ feedback subsequent to the first uplink channel, wherein the first feedback and the second feedback are associated with a same transport block or a same set of code block groups of the downlink data transmission.

27. The apparatus of claim 26, wherein the first result is based at least in part on attempting to demodulate the downlink data transmission as received via a first antenna set, and the second result is based at least in part on attempting to demodulate the downlink data transmission as received via a second antenna set.

28. The apparatus of claim 27, wherein the first antenna set includes a first antenna panel and the second antenna set includes a second antenna panel.

29. The method of claim 16, wherein transmitting the second feedback comprises:
  transmitting the second feedback based at least in part on the first result of demodulating the downlink data transmission being unsuccessful.

30. The apparatus of claim 2, wherein the soft reporting information indicates a combined set of least likelihood ratios for the first antenna set and the second antenna set.

* * * * *